(12) United States Patent
Steinbach et al.

(10) Patent No.: US 11,476,470 B2
(45) Date of Patent: Oct. 18, 2022

(54) CATALYST

(71) Applicant: 3M INNOVATIVE PROPERTIES COMPANY, St. Paul, MN (US)

(72) Inventors: Andrew J. L. Steinbach, Shoreview, MN (US); Andrew T. Haug, Woodbury, MN (US); Krzysztof A. Lewinski, Mahtomedi, MN (US); Amy E. Hester, Hudson, WI (US); Grant M. Thoma, Woodbury, MN (US); Cedric Bedoya, Woodbury, MN (US); James A. Phipps, River Falls, WI (US); David J. Rowe, Roseville, MN (US); Cemal S. Duru, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/733,736

(22) PCT Filed: Apr. 11, 2019

(86) PCT No.: PCT/IB2019/053003
§ 371 (c)(1),
(2) Date: Oct. 9, 2020

(87) PCT Pub. No.: WO2019/198031
PCT Pub. Date: Oct. 17, 2019

(65) Prior Publication Data
US 2021/0066724 A1 Mar. 4, 2021

Related U.S. Application Data

(60) Provisional application No. 62/657,196, filed on Apr. 13, 2018.

(51) Int. Cl.
*H01M 4/86* (2006.01)
*H01M 4/88* (2006.01)
(Continued)

(52) U.S. Cl.
CPC ....... *H01M 4/8657* (2013.01); *H01M 4/8871* (2013.01); *H01M 4/9058* (2013.01); *H01M 4/925* (2013.01); *H01M 4/94* (2013.01)

(58) Field of Classification Search
CPC ............ H01M 4/8657; H01M 4/8871; H01M 4/9058; H01M 4/92; H01M 4/925; H01M 4/94; Y02E 60/50
See application file for complete search history.

(56) References Cited

U.S. PATENT DOCUMENTS

| 4,340,276 A | 7/1982 | Maffitt |
| 4,447,506 A | 5/1984 | Luczak |

(Continued)

FOREIGN PATENT DOCUMENTS

| CN | 102820475 | 2/2016 |
| EP | 2959968 | 12/2015 |

(Continued)

OTHER PUBLICATIONS

Artem, "Development of Ternary and Quaternary Catalysts for the Electrooxidation of Glycerol", The Scientific World Journal, 2012, vol. 2012, Article ID 502083, 6 pages.

(Continued)

*Primary Examiner* — Victoria H Lynch

(57) ABSTRACT

Catalyst comprising a first layer having an outer layer with a layer comprising Pt directly thereon, wherein the first layer has an average thickness in a range from 0.04 to 30 nanometers, and wherein the layer. Catalysts described herein are useful, for example, in fuel cell membrane electrode assemblies.

10 Claims, 4 Drawing Sheets

(51) Int. Cl.
  *H01M 4/90* (2006.01)
  *H01M 4/92* (2006.01)
  *H01M 4/94* (2006.01)

(56) References Cited

U.S. PATENT DOCUMENTS

| | | |
|---|---|---|
| 4,568,598 A | 2/1986 | Bilkadi |
| 4,812,352 A | 3/1989 | Debe |
| 5,039,561 A | 8/1991 | Debe |
| 5,068,161 A | 11/1991 | Keck |
| 5,183,713 A | 2/1993 | Kunz |
| 5,338,430 A | 8/1994 | Parsonage |
| 5,759,944 A | 6/1998 | Buchanan |
| 5,879,827 A | 3/1999 | Debe |
| 5,879,828 A | 3/1999 | Debe |
| 6,040,077 A | 3/2000 | Debe |
| 6,136,412 A | 10/2000 | Spiewak |
| 6,319,293 B1 | 11/2001 | Debe |
| 6,805,972 B2 | 10/2004 | Erlebacher |
| 7,419,741 B2 | 9/2008 | Vernstrom |
| 7,901,829 B2 | 3/2011 | Debe |
| 8,211,825 B2 | 7/2012 | Mei |
| 8,673,773 B2 | 3/2014 | Opperman |
| 8,748,330 B2 | 6/2014 | Debe |
| 8,895,206 B2 | 11/2014 | Erlebacher |
| 2002/0004453 A1 | 1/2002 | Haugen |
| 2004/0048466 A1 | 3/2004 | Gore |
| 2005/0053826 A1 | 3/2005 | Wang |
| 2010/0047668 A1 | 2/2010 | Steinbach |
| 2014/0246304 A1 | 9/2014 | Debe |
| 2015/0093685 A1 | 4/2015 | Yang |
| 2015/0132683 A1* | 5/2015 | Shirvanian ........ H01M 4/8657 429/528 |
| 2015/0311536 A1 | 10/2015 | Atanasoska |
| 2015/0364769 A1* | 12/2015 | Cerri ................ H01M 4/9016 156/230 |
| 2015/0380758 A1 | 12/2015 | Ball |
| 2016/0079604 A1 | 3/2016 | Atanasoski |
| 2018/0062181 A1 | 3/2018 | Gath |

FOREIGN PATENT DOCUMENTS

| | | |
|---|---|---|
| EP | 2954579 | 4/2018 |
| EP | 2843066 | 8/2019 |
| JP | H03-236160 | 10/1991 |
| JP | H06-132034 | 5/1994 |
| JP | 2010-280974 | 12/2010 |
| JP | 2011-014475 | 1/2011 |
| WO | WO 2001-048839 | 7/2001 |
| WO | WO 2008-025750 | 3/2008 |
| WO | WO 2009-135189 | 11/2009 |
| WO | WO 2010-092369 | 8/2010 |
| WO | WO 2010-138138 | 12/2010 |
| WO | WO 2012-017226 | 2/2012 |
| WO | WO 2012-107738 | 8/2012 |
| WO | WO 2013-055533 | 4/2013 |
| WO | WO 2014-099790 | 6/2014 |
| WO | WO 2014-122426 | 8/2014 |
| WO | WO 2014-122427 | 8/2014 |
| WO | WO 2016-100034 | 6/2016 |
| WO | WO 2016-191057 | 12/2016 |
| WO | WO 2018-080791 | 5/2018 |
| WO | WO 2019-193458 | 10/2019 |
| WO | WO 2019-193460 | 10/2019 |
| WO | WO 2019-193461 | 10/2019 |
| WO | WO 2019-195046 | 10/2019 |
| WO | WO 2019-198029 | 10/2019 |
| WO | WO 2019-198033 | 10/2019 |

OTHER PUBLICATIONS

Arun, "Electrochemical Characterization of Pt—Ru—Ni/C Anode Electrocatalyst for Methanol Electrooxidation in Membraneless Fuel Cells," RSC Advances, Jun. 2015, vol. 5, pp. 49643-49650.

Cheng, "Enhanced Activity and Stability of Core-Shell Structured PtRuNi$_x$ Electrocatalysts for Direct Methanol Fuel Cells," International Journal of Hydrogen Energy, Jan. 2016, vol. 41, No. 3, pp. 1935-1943.

Chessin, "Paramagnetic Susceptibility, Electrical Resistivity, and Lattice Parameters of Nickel-Rich Nickel-Tantalum Alloys," Journal of Applied Physics, Aug. 1964, vol. 35 No. 8, pp. 2419-2423.

Choi, "Methanol Oxidation on Pt/Ru, Pt/Ni, and Pt/Ru/Ni Anode Electrocatalysts at Different Temperatures for DMFCs" Journal of the Electrochemical Society, 2003, vol. 150, No. 7, pp. A973-A978.

Chow, "Fabrication of Biologically Based Microstructure Composites for Vacuum Field Emission", Materials Science and Engineering A, Oct. 1992, vol. 158, No. 1, pp. 1-6.

Clancey, "Atomic Layer Deposition of Ultrathin Platinum Films on Tungsten Atomic Layer Deposition Adhesion Layers: Application to High Surface Area Substrates," Journal of Vacuum Science and Technology, Part A, Jan. 1901, vol. 33, No. 1, 9 pages.

Cooper, "Combinatorial screening of fuel cell cathode catalyst compositions", Applied Surface Science, 254, 2007, pp. 662-668.

Debe, "Effect of Gravity on Copper Phthalocyanine Thin Films III: Microstructure Comparisons of Copper Phthalocyanine Thin Films Grown in Microgravity and Unit Gravity", Thin Solid Films, 186, 1990, pp. 327-347.

Debe, "Vacuum Vapor Deposited Thin Films of a Perylene Dicarboxide Derivative: Microstructure Versus Deposition Parameters", Journal of Vacuum Science & Technology A, vol. 6, No. 3, May/Jun. 1988, pp. 1907-1911.

Edwards, "Basic Materials Physics of Transparent Conducting Oxides," Dalton Transactions, 2004, vol. 19, pp. 2995-3002.

Erlebacher, "Evolution of Nanoporosity in Dealloying", Letters to Nature, Mar. 2001, vol. 410, pp. 450-453.

Gerstenberg "Effects of Nitrogen, Methane, and Oxygen on Structure and Electrical Properties of Thin Tantalum Films," Journal of Applied Physics, Feb. 1964, vol. 35, No. 2, pp. 402-407.

Hitosugi, Ta-doped Anatase TiO2 Epitaxial Film as Transparent Conducting Oxide, Japanese Journal of Applied Physics, 2005, vol. 44, No. 34, pp. L1063-L1065.

Hu, "A Facile and Surfactant-Free Route for Nanomanufacturing of Tailored Ternary Nanoalloys as Superior Oxygen Reduction Reaction Electrocatalysts", Catalysis Science & Technology, Apr. 2017, vol. 7. No. 10, pp. 2074-2086.

Ioroi, "Platinum-Iridium Alloys as Oxygen Reduction Electrocatalysts for Polymer Electrolyte Fuel Cells", Journal of the Electrochemical Society, 2005, vol. 152, No. 10, pp. A1917-A1924.

Johnson, "In Situ Reactivity and TOF-SIMS Analysis of Surfaces Prepared by Soft and Reactive Landing of Mass-Selected Ions", Analytical Chemistry, 2010, vol. 82, No. 13, pp. 5718-5727.

Johnson, "Preparation of Surface Organometallic Catalysts by Gas-Phase Ligand Stripping and Reactive Landing of Mass-Selected Ions", Chemistry: A European Journal, 2010, vol. 16, No. 48, pp. 14433-14438.

Ju, Electrical Properties of Amorphous Titanium Oxide Thin Films for Bolometric Application, Advances in Condensed Matter Physics, Nov. 2013, Article ID 365475, 5 pages.

KAM "Summary Abstract: Dramatic Variation of the Physical Microstructure of a Vapor Deposited Organic Thin Film", Journal of Vacuum Science & Technology A, vol. 5, No. 4, Jul./Aug. 1987, pp. 1914-1916.

Kim, "High-Performance Quaternary PtRuIrNi Electrocatalysts with Hierarchical Nanostructured Carbon Support," Journal of Catalysis, Oct. 2013, vol. 306, pp. 133-145.

Lee, "Measurement and Modeling of the Reflectance-Reducing Properties of Gradient Index Microstructured Surfaces", Photographic Science and Engineering, vol. 24, No. 4, Jul./Aug. 1980, pp. 211-216.

Lewinski, "NSTF Advances for PEM Electrolysis—the Effect of Alloying on Activity of NSTF Electrolyzer Catalysts and Performance of NSTF Based PEM Electrolyzers", ECS Transactions, Oct. 2015, vol. 69, No. 17, pp. 893-917.

Li, "Preparation and Electrochemical Research of Anode Catalyst PtRuNi/C for Direct Methanol Fuel Cell," Journal of Biobased Materials and Bioenergy, Aug. 2013, vol. 7, No. 4, pp. 525-528.

(56) References Cited

OTHER PUBLICATIONS

Liang, "Synthesis and Structure-Activity Relationship Exploration of Carbon-Supported PtRuNi Nanocomposite as a CO-Tolerant Electrocatalyst for Proton Exchange Membrane Fuel Cells", Journal of Physical Chemistry B, Mar. 2006, vol. 110, No. 15, pp. 7828-7834.
Liu, "Methanol Oxidation on Carbon-Supported Pt—Ru—Ni Ternary Nanoparticle Electrocatalysts," Journal of Power Sources, Jan. 2008, vol. 175, No. 1, pp. 159-165.
Liu, "Segmented Pt/Ru, Pt/Ni, and Pt/RuNi Nanorods as Model Bifunctional Catalysts for Methanol Oxidation," Small, Jan. 2006, vol. 2, No. 1, pp. 121-128.
Liu, "RDE Measurements of ORR Activity of $Pt_{1-x}Ir_x$ (0<x<0.3) on High Surface Area NSTF-Coated Glassy Carbon Disks," Journal of the Electrochemical Society, 2010, vol. 157, No. 2, pp. B207-B214.
Mani, "Dealloyed Binary PtMs (M=Cu. Co, Ni) and Ternary PtNi3M (M=Cu, Co, Fe, Cr) Electrocatalysts for the Oxygen Reduction Reaction: Performance in Polymer Electrolyte Membrane fuel Cells", Journal of Power Sources, Jan. 2011, vol. 196, No. 2, pp. 666-673.
Martinez-Huerta, "Effect of Ni Addition Over PtRu/C Based Electrocatalysts for Fuel Cell Applications," Applied Catalysis B: Environmental, Dec. 2006, vol. 69, No. 1-2, pp. 75-84.
Moreno, "Synthesis of the Ceramic-Metal Catalysts (PtRuNi-TiO2) by the Combustion Method," Journal of Power Sources, Jun. 2007, vol. 169, No. 1, pp. 98-102.
Nan, "A Core-Shell $Pd_1Ru_1Ni_2$@Pt/C Catalyst with a Ternary Alloy Core and Pt Monolayer: Enhanced Activity and Stability Towards the Oxygen Reduction Reaction by the Addition of Ni," Journal of Materials Chemistry A, 2016, vol. 4, No. 3, pp. 847-855.
Ohnuma, "Amorphous Ultrafine Metallic Particles Prepared By Sputtering Method", Rapidly Quenched Metals, (Proc. of the Fifth Int. Conf. on Rapidly Quenched Metals, Wurzburg, Germany, Sep. 3-7, 1984), S. Steeb et al., eds., Elsevier Science Publishers B. V., New York, (1985), pp. 1117-1124.
Palma, "Development of Plurimetallic Electrocatalysts Prepared by Decomposition of Polymeric Precursors for $EtOH/O_2$ Fuel Cell," Journal of the Brazilian Chemical Society, Mar. 2012, vol. 23, No. 3, pp. 555-564.
Palma, "Ethanol Electrooxidation by Plurimetallic Pt-Based Electrocatalysts Prepared by Microwave Assisted Heating," Journal of the Electrochemical Society, Feb. 2014, vol. 161, No. 4, pp. F473-F479.
Papaderakis, "Ternary Pt—Ru—Ni Catalytic Layers for Methanol Electrooxidation Prepared by Electrodeposition and Galvanic Replacement," Frontiers in Chemistry, Jun. 2014, vol. 2, Art. 29, pp. 1-11.
Park, "Chemical and Electronic Effects of Ni in Pt/Ni and Pt/Ru/Ni Alloy Nanoparticles in Methanol Electrooxidation," Journal of Physical Chemistry B, Feb. 2002, vol. 106, No. 8, pp. 1869-1877.
Paul, "Electrochemical Oxidation of Ethanol on Thin Coating of Platinum-Based Material on Nickel Support," Indian Journal of Chemistry, May 2006, vol. 45, pp. 1144-1152.
Pierson, "Handbook of Refractory Carbides and Nitrides", 1996, pp. 1-7.
Ribadeneira, "Co-Catalytic Effect of Nickel in Pt—Ru/C and Pt—Sn/C Electrocatalysts For Ethanol Electrooxidation," Latin American Applied Research, Apr. 2010, vol. 40, No. 2, pp. 113-118.
Sadaoka, "Effects of Morphology on NO2 Detection in Air at Room Temperature with Phthalocyanine Thin Films", Journal of Material Science, vol. 25, 1990, pp. 5257-5268.
Scott, "The Journal of the Institute of Metals", 1919, vol. XXI, p. 441.
Shao, "Evaluation of the Performance of Carbon Supported Pt—Ru—Ni—P as Anode Catalyst for Methanol Electrooxidation," Fuel Cells, 2010, vol. 10, No. 3, pp. 472-477.
Shen, "Comparison Study of Few-Layered Graphene Supported Platinum and Platinum Alloys for Methanol and Ethanol Electro-Oxidation," Journal of Power Sources, Mar. 2015, vol. 278, pp. 235-244.
Sheng, "TiC Supported Pt—Ir Electrocatalyst Prepared by Plasma Process for the Oxygen Electrode in Unitized Regenerative Fuel Cells," Journal of Power Sources, 2011, vol. 196, No. 13, pp. 5416-5422.
Shui, Evolution of Nanoporous Pt—Fe Alloy Nanowires by Dealloying and their Catalytic Property for Oxygen Reduction Reaction, Advanced Functional Materials, Sep. 2011, vol. 21, No. 17, pp. 3357-3362.
Sudachom, "One Step $NaBH_4$ Reduction of Pt—Ru—Ni Catalysts on Different Types of Carbon Supports for Direct Ethanol Fuel Cells: Synthesis and Characterization," Journal of Fuel Chemistry and Technology, May 2017, vol. 45, No. 5, pp. 596-607.
Sun, "Ternary PtRuNi Nanocatalysts Supported on N-Doped Carbon Nanotubes: Deposition Process, Material Characterization, and Electrochemistry," Journal of the Electrochemical Society, Aug. 2009, vol. 156, No. 10, pp. B1249-B1252.
Tang, "High dispersion and electrocatalytic properties of platinum on well-aligned carbon nanotube arrays", Carbon, 2004, vol. 42, pp. 191-197.
Vliet, "Mesostructured thin films as electrocatalysts with tunable composition and surface morphology", Nature Materials, Nov. 2012, vol. 11, No. 12, pp. 1051-1058.
Wang, "Structurally ordered intermetallic platinum-cobalt core-shell nanoparticles with enhanced activity and stability as oxygen reduction electrocatalysts", Nature Materials, Jan. 2013, vol. 12, No. 1, pp. 81-87.
Wang, "An Advantageous Method for Methanol Oxidation: Design and Fabrication of a Nanoporous PtRuNi Trimetallic Electrocatalyst," Journal of Power Sources, Nov. 2011, vol. 196, No. 22, pp. 9346-9351.
Wang, "Effect of a Carbon Support Containing Large Mesopores on the Performance of a Pt—Ru—Ni/C Catalyst for Direct Methanol Fuel Cells," Journal of Physical Chemistry C, 2010, vol. 114, No. 1, pp. 672-677.
Wang, "Effect of Annealing Heat Treatment on Stability of Pt—Ru—Ni/C Catalyst for Direct Methanol Fuel Cell," Chinese Journal of Power Sources, Feb. 2009, Abstract only.
Wang, "Effect of Ni on PtRu/C Catalyst Performance for Ethanol Electrooxidation in Acidic Medium," Journal of Physical Chemistry C, 2008, vol. 112, No. 16, pp. 6582-6587.
Wang, "Electrochemical Impedance Studies on Carbon Supported PtRuNi and PtRu Anode Catalysts in Acid Medium for Direct Methanol Fuel Cell," Journal of Power Sources, Feb. 2007, vol. 165, No. 1, pp. 9-15.
Woo, "Electrocatalytic Characteristics of Pt—Ru—Co and Pt—Ru—Ni Based on Covalently Cross-Linked Sulfonated Poly (ether ether ketone)/Heteropolyacids Composite Membranes for Water Electrolysis", Journal of Industrial and Engineering Chemistry, Sep. 2010, vol. 16, No. 5, pp. 688-697.
Yang, "Truncated Octahedral Platinum-Nickel-Iridium Ternary Electrocatalyst for Oxygen Reduction Reaction", Journal of Power Sources, 2015, vol. 291, pp. 201-208.
Ye, "Carbon Nanotubes Supported Pt—Ru—Ni as Methanol Electro-Oxidation Catalyst for Direct Methanol Fuel Cells," Journal of Natural Gas Chemistry, Jun. 2007, vol. 16, No. 2, pp. 162-166.
Yousaf, "Method to Prepare Ternary Methanol Electro-Oxidation Catalysts for Direct Methanol Fuel Cell Applications" Journal of the Electrochemical Society, Apr. 2017, vol. 164, No. 6, pp. 667-673.
Zhang, "Preparation of Pt—Ru—Ni Ternary Nanoparticles by Microemulsion and Electrocatalytic Activity for Methanol Oxidation," Materials Research Bulletin, Feb. 2007, vol. 42, No. 2, pp. 327-333.
Zhao, "Electrodeposition of Pt—Ru and Pt—Ru—Ni Nanoclusters on Multi-Walled Carbon Nanotubes for Direct Methanol Fuel Cell," International Journal of Hydrogen Energy, Mar. 2014, vol. 39, No. 9, pp. 4544-4557.
International Search Report for PCT International Application No. PCT/IB2019/053003, dated Sep. 2, 2019, 7 pages.

\* cited by examiner

CATALYST

CROSS REFERENCE TO RELATED APPLICATIONS

This application is a national stage filing under 35 U.S.C. 371 of PCT/IB2019/053003, filed Apr. 11, 2019, which claims the benefit of U.S. Provisional Patent Application No. 62/657,196, filed Apr. 13, 2018, the disclosure of which is incorporated by reference in its/their entirety herein.

This invention was made with Government support under Contract No. DE-EE0007270 awarded by DOE. The Government has certain rights in this invention.

BACKGROUND

Fuel cells produce electricity via electrochemical oxidation of a fuel and reduction of an oxidant. Fuel cells are generally classified by the type of electrolyte and the type of fuel and oxidant reactants. One type of fuel cell is a polymer electrolyte membrane fuel cell (PEMFC), where the electrolyte is a polymeric ion conductor and the reactants are hydrogen fuel and oxygen as the oxidant. The oxygen is often provided from the ambient air.

PEMFCs typically require the use of electrocatalysts to improve the reaction rate of the hydrogen oxidation reaction (HOR) and oxygen reduction reactions (ORR), which improve the PEMFC performance. PEMFC electrocatalysts often comprise platinum, a relatively expensive precious metal. It is typically desirable to minimize the platinum content in PEMFC increasing the catalyst activity per unit catalyst surface area (specific activity) and increasing the catalyst surface area per catalyst mass (specific surface area or specific area). The HOR and ORR occur on the catalyst surface, so increasing the specific surface area and/or the specific activity can reduce the devices to minimize cost. Sufficient platinum content, however, is needed to provide sufficient catalytic activity and PEMFC device performance. As such, there is a desire to increase the catalyst activity per unit catalyst mass (mass activity). There are two general approaches to increase the mass activity, namely amount of catalyst needed to achieve a desired absolute performance, reducing cost.

To maximize specific area, PEMFC electrocatalysts are often in the form of nanometer-scale thin films or particles on support materials. An exemplary support material for nanoparticle PEMFC electrocatalysts is carbon black, and an exemplary support material for thin film electrocatalysts is whiskers.

To increase the specific activity, PEMFC Pt ORR electrocatalysts often also comprise certain transition metals such as cobalt or nickel. Without being bound by theory, incorporation of certain transition metals into the Pt lattice is believed to induce contraction of the Pt atoms at the catalyst surface, which increases the kinetic reaction rate by modification of the molecular oxygen binding and dissociation energies and the binding energies of reaction intermediates and/or spectator species.

PEMFC electrocatalysts may incorporate other precious metals. For example, HOR PEMFC Pt electrocatalysts can be alloyed with ruthenium to improve tolerance to carbon monoxide, a known Pt catalyst poison. HOR and ORR PEMFC electrocatalysts may also incorporate iridium to facilitate improved activity for the oxygen evolution reaction (OER). Improved OER activity may improve the durability of the PEMFC under inadvertent operation in the absence of fuel and during PEMFC system startup and shutdown. Incorporation of iridium with the PEMFC ORR electrocatalyst, however, may result in decreased mass activity and higher catalyst cost. Iridium has relatively lower specific activity for ORR than platinum, potentially resulting in decreased catalyst mass activity. Iridium is also a precious metal, and thereby its incorporation can increase cost. PEMFC Pt electrocatalysts may also incorporate gold which is also a precious metal and can increase cost. Gold is known to be relatively inactive for HOR and ORR in acidic electrolytes. Incorporation of gold can result in substantial deactivation for HOR and ORR due to the propensity for gold to preferentially segregate to the electrocatalyst surface, blocking active catalytic sites.

PEMFC electrocatalysts may have different structural and compositional morphologies. The structural and compositional morphologies are often tailored through specific processing methods during the electrocatalyst fabrication, such as variations in the electrocatalyst deposition method and annealing methods. PEMFC electrocatalysts can be compositionally homogenous, compositionally layered, or may contain composition gradients throughout the electrocatalyst. Tailoring of composition profiles within the electrocatalyst may improve the activity and durability of electrocatalysts. PEMFC electrocatalyst particles or nanometer-scale films may have substantially smooth surfaces or have atomic or nanometer scale roughness. PEMFC electrocatalysts may be structurally homogenous or may be nanoporous, being comprised of nanometer-scale pores and solid catalyst ligaments.

In PEMFC devices, electrocatalysts may lose performance over time due to a variety of degradation mechanisms, which induce structural and compositional changes. Such performance loss may shorten the practical lifetime of such systems. Electrocatalyst degradation may occur, for example, due to loss of electrocatalyst activity per unit surface area and loss of electrocatalyst surface area. Electrocatalyst specific activity may be lost, for example, due to the dissolution of electrocatalyst alloying elements. Nanoparticle and nano-scale thin film electrocatalysts may lose surface area, for example, due to Pt dissolution, particle sintering, agglomeration, and loss of surface roughness.

Additional electrocatalysts and systems containing such catalysts are desired, including those that address one or more of the issues discussed above.

SUMMARY

In one aspect, the present disclosure provides a first catalyst comprising a first layer comprising a first material, wherein the first material comprises at least one Ti, W, Hf, Zr, of Nb, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the at least one of Ti, W, Hf, Zr, of Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, 0.28:1 to 9.04:1, 1.74:1 to 9.04:1, 0.98:1 to 1.41:1, or even 1.16:1 to 2.80:1).

In another aspect, the present disclosure provides a second catalyst comprising a first layer comprising a first material, wherein the first material comprises at least one of Ta, Ti, W, Hf, Zr, or Nb, and at least one of O, N, or C, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the at least one of Ta, Ti, W, Hf, Zr, or Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

In another aspect, the present disclosure provides a third catalyst comprising a first layer comprising a first material, wherein the first material comprises at least one of Ta, Ti, W, Hf, Zr, or Nb, and at least one of Ni, Co, Fe, Mn, Ir, or Pt, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and at least one of Ta, Ti, W, Hf, Zr, or Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

In another aspect, the present disclosure provides a fourth catalyst comprising a first layer comprising a first material, wherein the first material comprises at least one of Pt or Ir, and at least one of Ni, Co, Fe or Mn, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the collective metal content within the first material are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

In another aspect, the present disclosure provides a method of making catalyst described herein, the method comprising depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, the method further comprises annealing at least one of the layers.

In another aspect, the present disclosure provides an article comprising nanostructured elements comprising microstructured whiskers having an outer surface having catalyst described herein thereon. In some embodiments of the articles, the first layer is directly on the microstructured whiskers.

In another aspect, the present disclosure provides a method of making an article described herein, the method comprising depositing any of the layers onto microstructured whiskers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, the method further comprises annealing at least one of the layers.

In another aspect, the present disclosure provides a method for making catalyst of described herein, the method comprising electrochemically cycling the catalyst.

Surprisingly, incorporation of a first layer described herein beneath a layer of ORR electrocatalyst can result in improved mass activity and specific surface area of the ORR electrocatalyst.

Catalysts described herein are useful, for example, in fuel cell membrane electrode assemblies.

DETAILED DESCRIPTION

—First Catalyst

Figure 1:
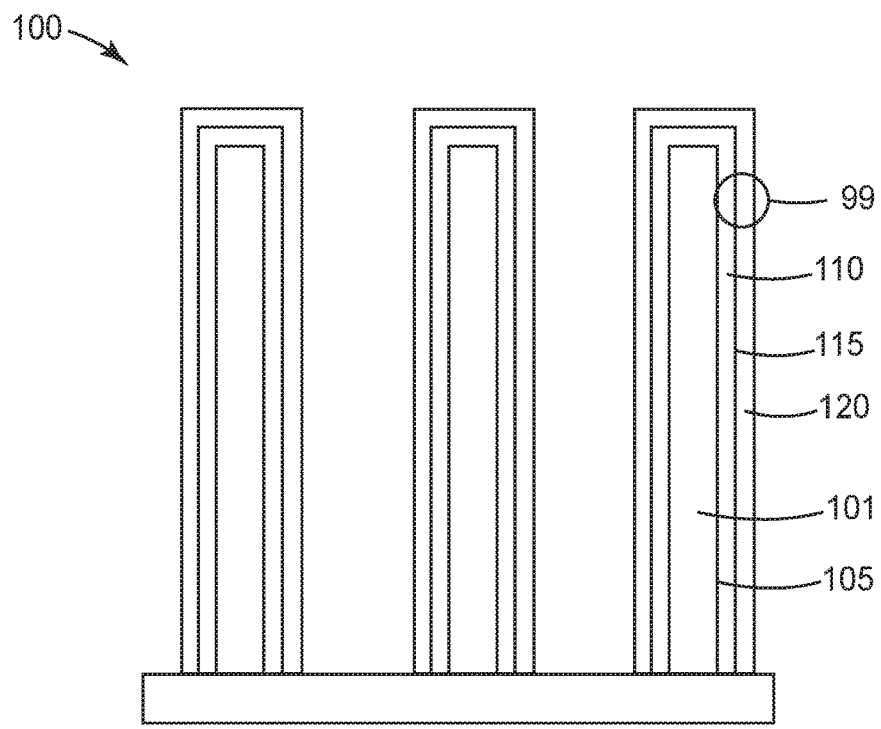
FIG. 1 is a side view of an exemplary catalyst described herein.

The first catalyst comprises a first layer comprising a first material, wherein the first material comprises at least one Ti, W, Hf, Zr, of Nb, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the at least one of Ti, W, Hf, Zr, of Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, 0.28:1 to 9.04:1, 1.74:1 to 9.04:1, 0.98:1 to 1.41:1, or even 1.16:1 to 2.80:1).

In some embodiments of the first catalyst, the first material comprises Ti, and wherein the Pt and Ti are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 0.27:1 to 1.07:1).

In some embodiments of the first catalyst, the first material comprises W, and wherein the Pt and W are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 0.24:1 to 0.94:1).

For use within polymer electrolyte membrane fuel cell catalysts, the first layer may beneficially comprise, for example, materials that are corrosion tolerant. Ti, W, Hf, Zr, and Nb are exemplary materials which may form bulk oxides or passivating surface oxides in the acidic, oxidizing conditions within a fuel cell. The bulk oxides may be corrosion tolerant, and the passivating surface oxides may impart corrosion tolerance to the underlying metal. Additionally, the first layer may beneficially comprise, for example, materials that are resistant to migration into the layer comprising Pt during processing, which may include thermal annealing. Ti, W, Hf, Zr and Nb are exemplary refractory metals, which have relatively high melting temperatures.

—Second Catalyst

The second catalyst comprising a first layer comprising a first material, wherein the first material comprises at least one of Ta, Ti, W, Hf, Zr, or Nb, and at least one of O, N, or C, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the at least one of Ta, Ti, W, Hf, Zr, or Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

In some embodiments of the second catalyst, the first material comprises at least one oxide of the at least one of Ta, Ti, W, Hf, Zr, or Nb. In some embodiments of the second catalyst, the atomic ratio of the at least one of Ta, Ti, W, Hf, Zr, or Nb collectively to 0 is in a range from 0.1:1 to 100:1 (in some embodiments, in a range from 0.5:1 to 99:1, 0.5:1 to 19:1, 0.5:1 to 10:1, 0.5:1 to 8:1, 0.5:1 to 6:1, 0.5:1 to 4:1, 0.5:1 to 3:1, 0.5:1 to 2:1, 1:1 to 2:1, or even 0.5:1 to 1:1).

In some embodiments of the second catalyst, the atomic ratio of the at least one of Ta, Ti, W, Hf, Zr, or Nb collectively to 0 is less than 0.5:1 (in some embodiments, less than 1:1, 2:1, 5:1, 10:1, or even less than 100:1).

In some embodiments of the second catalyst, the first material comprises the Ta and the O in the form of at least tantalum oxide. In some embodiments of the second catalyst, the atomic ratio of the Pt to Ta are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 1.16:1 to 2.32:1).

In some embodiments of the second catalyst, the first material comprises the Ta and the Ti, and wherein the Ta to Ti atomic ratio is in a range from 0.01:1 to 100:1 (in some embodiments, in a range from 0.01:1 to 50:1, 0.01:1 to 33:1, 0.01:1 to 20:1, 0.01:1 to 10:1, 0.01:1 to 5:1, 0.01:1 to 3.3:1, 0.01:1 to 2:1, 0.01:1 to 1:1, 0.1:1 to 1:1, 0.1:1 to 0.5:1, or even 0.11:1 to 0.44:1). In some embodiments of the second catalyst, the first material further comprises the O in the form of at least tantalum-doped titanium dioxide.

In some embodiments of the second catalyst, the first material is an electronic conductive oxide.

Figure 2:
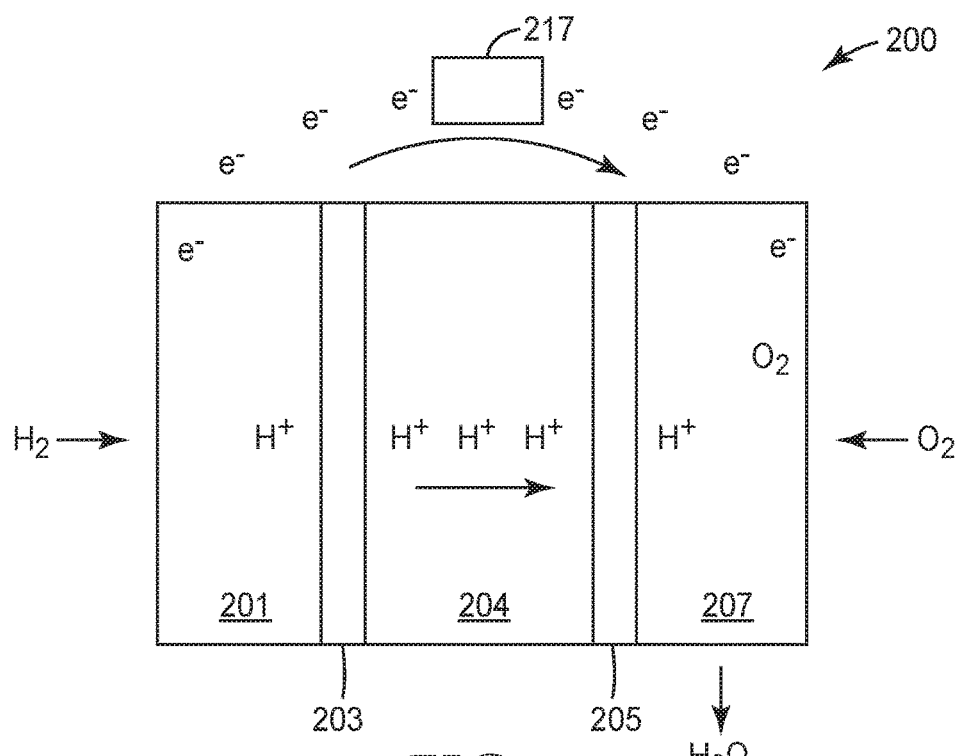
FIG. 2 is a schematic of an exemplary fuel cell.

For use within polymer electrolyte membrane fuel cell catalysts, the first layer may beneficially comprise, for example, materials that have sufficient electronic conductivity, especially for catalysts with low atomic ratios of Pt to the collective first layer metal content. In some embodiments, the first layer has an electronic conductivity of at least $1 \times 10^3$ S/m (in some embodiments, the first layer has a conductivity of at least $1 \times 10^4$, $1 \times 10^5$, or even $1 \times 10^6$ S/m). For the Pt in the Pt layer to be utilized in the fuel cell anode or cathode, it typically has at least one electronically conductive path with sufficient electronic conductivity to allow electrons to flow through an external electrical circuit, as shown in FIG. 2 and discussed below. At low Pt to collective first layer metal atomic ratios, the Pt layer may be relatively thin and discontinuous, and a portion of the Pt may be isolated and not in contact with the remaining metal within the Pt layer. Additionally, if the Pt in the Pt layer is on a first layer which has insufficient electronic conductivity, the Pt may not be well utilized. To be utilized for catalytic reactions, the isolated Pt in the Pt layer may beneficially be on the surface of a first layer which has sufficient electronic conductivity. In metallic form, first layers comprising at least one of Ta, Ti, W, Hf, Zr, or Nb may have sufficient electronic conductivity. In the acidic, oxidizing fuel cell environment, however, first layers comprising at least one of Ta, Ti, W, Hf, Zr, or Nb may form bulk oxides or passivating surface oxides, which may have lower electronic conductivity than first layers comprising at least one of Ta, Ti, W, Hf, Zr, or Nb which do not contain oxygen or contain less oxygen. The conductivity of first layers comprising at least one of Ta, Ti, W, Hf, Zr, or Nb may depend on oxygen content. For details of the conductivity of Ta as a function of oxygen content, see, for example, D. Gerstenberg and C. J. Calbick, J. Appl. Phys., 1964, 35, pp. 402-407, the disclosure of which is incorporated herein by reference. For details of the conductivity of Ti as a function of oxygen content, see, for example, Y. Ju et al., Advances in Condensed Matter Physics, 2013, Article ID 365475, the disclosure of which is incorporated herein by reference.

Electronic conductive oxides are a class of doped metal oxides which have lower electronic resistance than the non-doped oxide. An exemplary electronic conductive oxide is tin-doped indium oxide. For more information on electronic conductive oxides, see, for example, P. P. Edwards et al., Dalton Trans., 2004, 19, pp. 2995-3002, the disclosure of which is incorporated herein by reference.

In some embodiments of the second catalyst, the first material is a corrosion-resistant electronic conductive oxide. For use in polymer electrolyte membrane fuel cell catalysts, the conductive oxide may beneficially have resistance to corrosion in acidic, oxidizing conditions. Corrosion-resistant electronic conductive oxides may beneficially comprise or essentially consist of refractory metal oxides. Examples of corrosion-resistant electronic conductive oxides include tantalum-doped titanium dioxide and niobium-doped titanium dioxide. For more information on tantalum-doped titanium dioxide, see, for example, T. Hitosugi et al., Jpn. J. Appl. Phys., 2005, 44, pp. L1063-L1065, the disclosure of which is incorporated herein by reference.

In some embodiments of the second catalyst, the first material comprises the at least one of Ta, Ti, W, Hf, Zr, or Nb and the N in the form of at least one nitride. In some embodiments of the second catalyst, the atomic ratio of the at least one of Ta, Ti, W, Hf, Zr, or Nb collectively to N is in the range from 0.1:1 to 100:1 (in some embodiments, in a range from 0.5:1 to 99:1, 0.5:1 to 19:1, 0.5:1 to 10:1, 0.5:1 to 8:1, 0.5:1 to 6:1, 0.5:1 to 4:1, 0.5:1 to 3:1, 0.5:1 to 2:1, 1:1 to 2:1, or even 0.5:1 to 1:1).

In some embodiments of the second catalyst, the first material comprises the Ti and the N in the form of at least titanium nitride. In some embodiments of the second catalyst, the atomic ratio of the Pt to Ti is in a range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 1:1).

In some embodiments of the second catalyst, the first material comprises the Ta and the N in the form of at least tantalum nitride. In some embodiments of the second catalyst, wherein the atomic ratio of Pt to Ta is in a range from 0.01:1 to 10:1 (in some embodiments, from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 2.30:1 to 2.34:1).

In some embodiments of the second catalyst, the first material comprises the at least one of Ta, Ti, W, Hf, Zr, or Nb and the C in the form of at least one carbide. In some embodiments of the second catalyst, wherein the atomic ratio of the at least one of Ta, Ti, W, Hf, Zr, or Nb collectively to C is in the range from 0.1:1 to 100:1 (in some embodiments, in a range from 0.5:1 to 99:1, 0.5:1 to 19:1, 0.5:1 to 10:1, 0.5:1 to 8:1, 0.5:1 to 6:1, 0.5:1 to 4:1, 0.5:1 to 3:1, 0.5:1 to 2:1, 1:1 to 2:1, or even 0.5:1 to 1:1).

In some embodiments of the second catalyst, the first material comprises the Ti, the O, and the N in the form of at least titanium oxynitride.

For use within polymer electrolyte membrane fuel cell catalysts, the first layer may beneficially comprise, for example, materials that have sufficient electronic conductivity, especially for catalysts with low atomic ratios of Pt to the collective first layer metal content. First layers comprising at least one of nitrides, carbides, oxynitrides, or oxycarbides of at least one of Ta, Ti, W, Hf, Zr, and Nb may have higher electronic conductivity than first layers which comprise or essentially consist of oxides of at least one of Ta, Ti, W, Hf, Zr, and Nb. For details of the conductivity of Ta as a function of oxygen, nitrogen, and carbon content, see, for example, D. Gerstenberg and C. J. Calbick, J. Appl. Phys., 1964, 35, pp. 402-407. Exemplary nitrides include TaN, $Ta_2N$, $Ta_5N_6$, $Ta_3N_5$, TiN, $W_2N$, WN, $WN_2$, $Zr_3N_4$, ZrN, $Nb_2N$, NbN, and Nb carbonitride. Exemplary carbides include TaC, $TaC_3$, $Ta_2C$, TiC, WC, WC, HfC, $HfC_2$, $Zr_2C$, $Zr_3C_2$, $Zr_6C_5$, $Nb_2C$ and NbC. For more information on carbides and nitrides of Ta, Ti, W, Hf, Zr, and Nb, see, for example, H. O. Pierson, "Handbook of Refractory Carbides and Nitrides", 1996, the disclosure of which is incorporated herein by reference.

—Third Catalyst

The third catalyst comprising a first layer comprising a first material, wherein the first material comprises at least one of Ta, Ti, W, Hf, Zr, or Nb, and at least one of Ni, Co, Fe, Mn, Ir, or Pt, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and at least one of Ta, Ti, W, Hf, Zr, or Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

In some embodiments of the third catalyst, the atomic ratio of the at least one of Ta, Ti, W, Hf, Zr, or Nb collectively to the at least one of Ni, Co, Fe, Mn, Ir, or Pt, collectively is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.1:1 to 10:1, or even 0.5:1 to 5:1).

In some embodiments of the third catalyst, the first material comprises the at least one of Ta, Ti, W, Hf, Zr, or Nb, and the at least one of Ni, Co, Fe, Mn, Ir, or Pt, in the form of at least one oxide. In some embodiments of the third catalyst, the first layer comprises the Ta and the Ir. In some embodiments of the third catalyst, the Ta to Ir atomic ratio is in a range from 0.1:1 to 10:1 (in some embodiments, in a range from 0:5:1 to 10:1 or even 0.71:1 to 9:41:1).

In some embodiments of the third catalyst, the first layer comprises the Ta and the Ni. In some embodiments of the third catalyst, the Ta to Ni atomic ratio is in a range from 0.01:1 to 10:1 (in some embodiments, in a range from 0.05:1 to 1:1, 0.05:1 to 0.5:1, or even 0.08:1 to 0.24:1).

For use within polymer electrolyte membrane fuel cell catalysts, the first layer may beneficially comprise, for example, materials which have sufficient electronic conductivity, especially for catalysts with low atomic ratios of Pt to the collective first layer metal content. First layers comprising at least one of Ta, Ti, W, Hf, Zr, or Nb with at least one of Ni, Co, Fe, Mn, Ir, or Pt may have higher electronic conductivity than layers which do not contain at least one of Ni, Co, Fe, Mn, Ir, or Pt. In the oxidizing, acidic environment of the fuel cell, Ni, Co, Fe, Mn, Ir and Pt may be present, for example, within catalysts in metallic (unoxidized) form, which has relatively higher electronic conductivity than the respective oxides. The conductivity of the first layer may depend upon the atomic ratio of the collective content of at least one of Ta, Ti, W, Hf, Zr, or Nb to the collective content of at least one of Ni, Co, Fe, Mn, Ir, or Pt, and the oxygen content in the first layer. For more information on the conductivity of Ni—Ta, see, for example, Chessin et al., J. Apply. Phys., 1964, 35, pp. 2419-2423, the disclosure of which is incorporated herein by reference. For more information on the conductivity of Ta with oxygen, see, for example, D. Gerstenberg and C. J. Calbick, J. Appl. Phys., 1964, 35, pp. 402-407.

In some embodiments, base metals, such as Ni, Co, Fe, and Mn, may be preferable for incorporation into the first layer instead of precious metals, such as Ir and Pt, due to lower cost. In some embodiments, however, precious metals may be preferable over base metals for incorporation into the first layer, due to higher corrosion tolerance. Base metals such as Ni, Co, Fe, and Mn may corrode in the acidic, oxidizing fuel cell environment, forming soluble cationic species. The presence of at least one of Ta, Ti, W, Hf, Zr, or Nb may facilitate stabilization of the base metals in the first layer. For more information on the stabilization of base metals by refractory metals, see, for example, "The Journal of the Institute of Metals", 1919, Volume XXI, pg. 441, the disclosure of which is incorporated herein by reference.

In some embodiments, precious metals, such as Pt or Ir, with desirable catalytic activity may be present, for example, in the first layer with at least one of Ta, Ti, W, Hf, Zr, or Nb. The first layer may also comprise oxygen, and be of the form of a mixed metal oxide. Mixed metal oxides are a class of materials with desirable catalytic properties, provided by an oxide of catalytic metal such as at least one of Pt or Ir, combined with at least one of an oxide of Ta, Ti, W, Hf, Zr, or Nb. Exemplary mixed metal oxides include $IrO_2$—$Ta_2O_5$, $PtO_2$—$Ta_2O_5$, $IrO_2$—$TiO_2$, $PtO_2$—$TiO_2$, $IrO_2$—$WO_3$, $PtO_2$—$WO_3$, $IrO_2$—$HfO_2$, $PtO_2$—$HfO_2$, $IrO_2$—$ZrO_2$, $PtO_2$—$ZrO_2$, $IrO_2$—$Nb_2O_5$, and $PtO_2$—$Nb_2O_5$.

—Fourth Catalyst

The fourth catalyst comprising a first layer comprising a first material, wherein the first material comprises at least one of Pt or Ir, and at least one of Ni, Co, Fe or Mn, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the collective metal content within the first material are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

In some embodiments of the fourth catalyst, the atomic ratio of the at least one of Pt or Ir collectively to the at least one of Ni, Co, Fe, Mn collectively is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.1:1 to 10:1, or even 0.5:1 to 5:1).

In some embodiments of the fourth catalyst, the first layer comprises the Ir and the Ni. In some embodiments of the fourth catalyst, the Ir to Ni atomic ratio is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.1:1 to 10:1, or even 0.06:1 to 0.74:1).

For use within polymer electrolyte membrane fuel cell catalysts, the first layer may beneficially comprise, for example, materials which have both sufficient electronic conductivity and low cost. For a given level of desired conductivity, first layers comprising at least one of Pt or Ir, and at least one of Ni, Co, Fe or Mn, may have lower cost than layers which do not contain at least one of Ni, Co, Fe, or Mn.

In some embodiments of catalysts described herein, the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the first layer.

In some embodiments of catalysts described herein further comprising at least one pair of alternating layers, wherein the first alternating layer comprises the first material, and wherein the second alternating layer comprises Pt.

In some embodiments of catalysts described herein, a layer of Ir is present between the first layer and the Pt layer, and wherein the layer comprising Ir has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, 0.04 to 0.63, 0.04 to 0.32, 0.04 to 0.16, or even 0.16 to 0.63) nanometers. In some embodiments of catalysts described herein, the atomic ratio of the first material to Ir is in a range from 0.01:1 to 100:1 (in some embodiments, in a range from 0.1:1 to 9:1, 0.33:1 to 3:1, 0.5:1 to 2:1, or even 0.59:1 to 2.35:1). In some embodiments of catalysts described herein, the layer comprising Pt further comprises Ni. In some embodiments of catalysts described herein, the Pt to Ni atomic ratio is in a range from 0.5:1 to 5:1 (in some embodiments, in a range from 0.5:1 to 2:1, 0.5:1 to 1:1, 0.57:1 to 0.69:1, or even 0.60:1).

In another aspect, the present disclosure provides an article comprising nanostructured elements comprising microstructured whiskers having an outer surface having catalyst described herein thereon. In some embodiments of the articles, the first layer is directly on the microstructured whiskers. In some embodiments, the articles further comprising at least one pair of alternating layers disposed between the outer surface of the microstructured whiskers and the first layer, wherein the first alternating layer comprises the first material and is directly on the microstructured whiskers, and wherein the second alternating layer comprises Pt. In some embodiments of the articles, the microstructured whiskers are attached to a backing (e.g., a membrane). In some embodiments of the articles, the backing has a microstructure on at least one of its surfaces. In some embodiments, the articles, comprises no electrically conductive carbon-based material.

Referring to FIG. 1, exemplary catalyst described herein 99 comprises first layer 110 having outer layer 115 with layer 120 comprising Pt directly thereon (i.e., directly on outer layer 115). First layer 110 has an average thickness on the microstructured whiskers in a range from 0.04 to 30 nanometers. Layer 120 comprising Pt has an average thickness on microstructured whiskers 101 in a range from 0.04 to 50 nanometers. As shown, optional nanostructured elements 100 comprises microstructured whiskers 101 having outer surface 105 with first layer 110 thereon (i.e., on outer surface 105).

In some embodiments, the microstructured whiskers are attached to a backing (e.g., a membrane). In some embodiments, wherein the backing has a microstructure on at least one of its surfaces.

Suitable whiskers can be provided by techniques known in the art, including those described in U.S. Pat. No. 4,812,352 (Debe), U.S. Pat. No. 5,039,561 (Debe), U.S. Pat. No. 5,338,430 (Parsonage et al.), U.S. Pat. No. 6,136,412 (Spiewak et al.), and U.S. Pat. No. 7,419,741 (Vernstrom et al.), the disclosures of which are incorporated herein by reference. In general, microstructured whiskers can be provided, for example, by vacuum depositing (e.g., by sublimation) a layer of organic or inorganic material onto a substrate (e.g., a microstructured catalyst transfer polymer sheet), and then, in the case of perylene red deposition, converting the perylene red pigment into microstructured whiskers by thermal annealing. Typically, the vacuum deposition steps are carried out at total pressures at or below about $10^{-3}$ Torr or 0.1 Pascal. Exemplary microstructures are made by thermal sublimation and vacuum annealing of the organic pigment C.I. Pigment Red 149 (i.e., N,N'-di(3,5-xylyl)perylene-3,4:9,10-bis(dicarboximide)). Methods for making organic microstructured layers are reported, for example, in Materials Science and Engineering, A158 (1992), pp. 1-6; J. Vac. Sci. Technol. A, 5, (4), July/August 1987, pp. 1914-16; J. Vac. Sci. Technol. A, 6, (3), May/August 1988, pp. 1907-11; Thin Solid Films, 186, 1990, pp. 327-47; J. Mat. Sci., 25, 1990, pp. 5257-68; Rapidly Quenched Metals, Proc. of the Fifth Int. Conf. on Rapidly Quenched Metals, Wurzburg, Germany (Sep. 3-7, 1984), S. Steeb et al., eds., Elsevier Science Publishers B.V., New York, (1985), pp. 1117-24; Photo. Sci. and Eng., 24, (4), July/August 1980, pp. 211-16; and U.S. Pat. No. 4,340,276 (Maffitt et al.) and U.S. Pat. No. 4,568,598 (Bilkadi et al.), the disclosures of which are incorporated herein by reference. Properties of catalyst layers using carbon nanotube arrays are reported in the article "High Dispersion and Electrocatalytic Properties of Platinum on Well-Aligned Carbon Nanotube Arrays", Carbon, 42, (2004), pp. 191-197. Properties of catalyst layers using grassy or bristled silicon are reported, for example, in U.S. Pat. App. Pub. No. 2004/0048466 A1 (Gore et al.).

Figure 4:
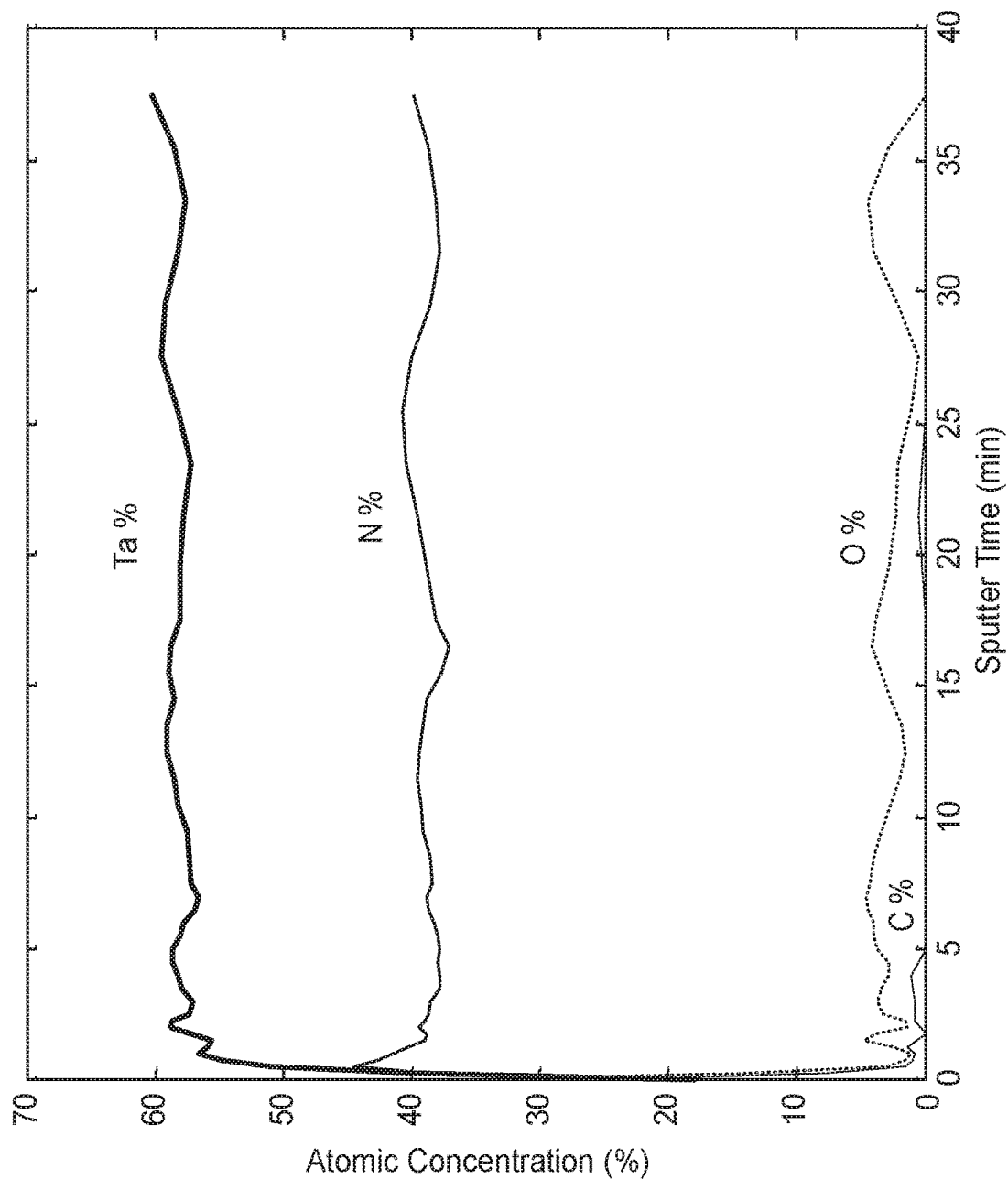
FIG. 4 is a plot of the composition depth profile of Illustrative Example II.

Vacuum deposition may be carried out in any suitable apparatus (see, e.g., U.S. Pat. No. 5,338,430 (Parsonage et al.), U.S. Pat. No. 5,879,827 (Debe et al.), U.S. Pat. No. 5,879,828 (Debe et al.), U.S. Pat. No. 6,040,077 (Debe et al.), and U.S. Pat. No. 6,319,293 (Debe et al.), and U.S. Pat. App. Pub. No. 2002/0004453 A1 (Haugen et al.), the disclosures of which are incorporated herein by reference). One exemplary apparatus is depicted schematically in FIG. 4A of U.S. Pat. No. 5,338,430 (Parsonage et al.), and discussed in the accompanying text, wherein the substrate is mounted on a drum, which is then rotated over a sublimation or evaporation source for depositing the organic precursor (e.g., perylene red pigment) prior to annealing the organic precursor in order to form the whiskers.

Typically, the nominal thickness of deposited perylene red pigment is in a range from about 50 nm to 500 nm. Typically, the whiskers have an average cross-sectional dimension in a range from 20 nm to 60 nm, an average length in a range from 0.3 micrometer to 3 micrometers, and an areal number density in a range from 30 to 70 whiskers per square micrometer.

In some embodiments, the whiskers are attached to a backing. Exemplary backings comprise polyimide, nylon, metal foils, or other materials that can withstand the thermal annealing temperature up to 300° C. In some embodiments, the backing has an average thickness in a range from 25 micrometers to 125 micrometers.

In some embodiments, the backing has a microstructure on at least one of its surfaces. In some embodiments, the microstructure is comprised of substantially uniformly shaped and sized features at least three (in some embodiments, at least four, five, ten, or more) times the average size of the whiskers. The shapes of the microstructures can, for example, be V-shaped grooves and peaks (see, e.g., U.S. Pat. No. 6,136,412 (Spiewak et al.), the disclosure of which is incorporated herein by reference) or pyramids (see, e.g., U.S. Pat. No. 7,901,829 (Debe et al.), the disclosure of which is incorporated herein by reference). In some embodiments, some fraction of the microstructure features extends above the average or majority of the microstructured peaks in a periodic fashion, such as every $31^{st}$ V-groove peak being 25% or 50% or even 100% taller than those on either side of it. In some embodiments, this fraction of features that extends above the majority of the microstructured peaks can be up to 10% (in some embodiments up to 3%, 2%, or even up to 1%). Use of the occasional taller microstructure features may facilitate protecting the uniformly smaller microstructure peaks when the coated substrate moves over the surfaces of rollers in a roll-to-roll coating operation. The occasional taller feature touches the surface of the roller rather than the peaks of the smaller microstructures, so much less of the microstructured material or whisker material is likely to be scraped or otherwise disturbed as the substrate moves through the coating process. In some embodiments, the microstructure features are substantially smaller than half the thickness of the membrane that the catalyst will be transferred to in making a membrane electrode assembly. This is so that during the catalyst transfer process, the taller microstructure features do not penetrate through the membrane where they may overlap the electrode on the opposite side of the membrane. In some embodiments, the tallest microstructure features are less than ⅓ or ¼ of the membrane thickness. For the thinnest ion exchange membranes (e.g., about 10 micrometers to 15 micrometers in thickness), it may be desirable to have a substrate with microstructured features no larger than about 3 micrometers to 4.5 micrometers tall. The steepness of the sides of the V-shaped or other microstructured features or the included angles between adjacent features may, in some embodiments, be desirable to be on the order of 90° for ease in catalyst transfer during a lamination-transfer process and to have a gain in surface area of the electrode that comes from the square root of two (1.414) surface area of the microstructured layer relative to the planar geometric surface of the substrate backing.

In general, the catalyst can be deposited by techniques known in the art. Exemplary deposition techniques include those independently selected from the group consisting of sputtering (including reactive sputtering), atomic layer deposition, metal organic chemical vapor deposition, molecular beam epitaxy, thermal physical vapor deposition, vacuum deposition by electrospray ionization, and pulse laser deposition. Additional general details can be found, for example, in U.S. Pat. No. 5,879,827 (Debe et al.), U.S. Pat. No. 6,040,077 (Debe et al.), and U.S. Pat. No. 7,419,741 (Vernstrom et al.), the disclosures of which are incorporated herein by reference. The thermal physical vapor deposition method uses suitable elevated temperature (e.g., via resistive heating, electron beam gun, or laser) to melt or sublimate the target (source material) into a vapor state, which is in turn passed through a vacuum space, then condensing of the vaporized form onto substrate surfaces. Thermal physical vapor deposition equipment is known in the art, including that available, for example, as a metal evaporator or as an organic molecular evaporator from CreaPhys GmbH, Dresden, Germany, under the trade designations "METAL EVAPORATOR (ME-SERIES)" or "ORGANIC MOLECULAR EVAPORATOR (DE-SERIES)" respectively; another example of an organic materials evaporator is available from Mantis Deposition LTD, Oxfordshire, UK, under the trade designation "ORGANIC MATERIALS EVAPORATIOR (ORMA-SERIES)." Catalyst material comprising multiple alternating layers can be sputtered, for example, from multiple targets (e.g., Pt is sputtered from a first target, Ni is sputtered from a second target, Ta from a third target, and Ir (if present) from a fourth target, or from a target(s) comprising more than one element (e.g., Pt and Ni)). It may be desirable that the coating layer be applied in a single step onto the gas distribution layer, gas dispersion layer, catalyst transfer layer, or membrane, so that the heat of condensation of the catalyst coating heats the underlying catalyst or support Pt, Ni, or other catalyst constituent atoms as applicable and substrate surface sufficient to provide enough surface mobility that the atoms are well mixed and form thermodynamically stable alloy domains. In some embodiments, it may be desirable to maintain the catalyst as distinct layers, and deposition conditions can be tailored to minimize the mixing of atoms. Alternatively, for example, the substrate can also be provided hot or heated to facilitate this atomic mobility, or cold or cooled to reduce the atomic mobility. In some embodiments, sputtering is conducted at least in part in an atmosphere comprising argon. Organometallic forms of catalysts can be deposited, for example, by soft or reactive landing of mass selected ions. Soft landing of mass-selected ions is used to transfer catalytically-active metal complexes complete with organic ligands from the gas phase onto an inert surface. This method can be used to prepare materials with defined active sites and thus achieve molecular design of surfaces in a highly controlled way under either ambient or traditional vacuum conditions. For additional details see, for example, Johnson et al., Anal. Chem., 2010, 82, pp. 5718-5727, and Johnson et al., Chemistry: A European Journal, 2010, 16, pp. 14433-14438, the disclosures of which are incorporated herein by reference.

In some embodiments of the method, depositing a layer comprising at least one of Ta, Ti, W, Hf, Zr, or Nb via reactive sputtering comprises sputtering with Ar and at least one of $N_2$ or $O_2$. In some embodiments of the method, the atomic ratio of Ar to $O_2$ is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.10:1 to 10:1, 0.50:1 to 5:1, 1:1 to 10:1, or even 5:1). In some embodiments of the method, the atomic ratio of Ar to $N_2$ is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.10:1 to 10:1, 0.50:1 to 5:1, 1:1 to 10:1, or even 7.4:1). For details of methods of Ta reactive sputtering, see, for example, D. Gerstenberg and C. J. Calbick, J. Appl. Phys., 1964, 35, pp. 402-407. For details of methods of Ti reactive sputtering, see, for example, Y. Ju et al., Advances in Condensed Matter Physics, 2013, Article ID 365475.

In some embodiments of the method, depositing a layer comprising Pt via metal organic chemical vapor deposition further comprises using a dimethyl(1,5-cyclooctadiene) platinum (II) precursor. In some embodiments of the method, depositing a layer comprising Ta via metal organic chemical vapor deposition further comprises using a tantalum (V) ethoxide precursor. In some embodiments, the method further comprises depositing with Ar and $H_2$ wherein the atomic ratio of Ar to $H_2$ is in a range from 1:1 to 100:1 (in some embodiments, in a range from 1:1 to 50:1, 1:1 to 25:1, 5:1 to 20:1, or even 10:1).

The planar equivalent thickness of an individual deposited catalyst layer is the thickness if deposited on a substantially flat, planar substrate. The planar equivalent thickness may depend, for example, on the areal catalyst loading of the layer and the catalyst density. For example, the planar equivalent thickness of a single layer of Pt with 10 micrograms of Pt per $cm^2$ planar area and density of 21.45 $g/cm^3$ deposited is calculated as 4.7 nm, the thickness of a Ni layer (8.90 $g/cm^3$) with the same areal loading is 11.2 nm, and the thickness of a Ta layer (16.4 $g/cm^3$) with the same areal loading is 6.1 nm. One or more layers can be deposited, resulting in a catalyst material with an overall planar equivalent thickness equal to the sum of each constituent layer's planar equivalent thickness.

In some embodiments, the catalyst material has a thickness that is the planar equivalent thickness of the catalyst material divided by the combined surface area of the whiskers and the backing. For example, a catalyst material with a planar equivalent thickness of 20 nm deposited onto a surface comprising microstructured whiskers on a planar backing with a combined surface area of 10 cm$^2$ of surface area per cm$^2$ of planar backing area will result in a catalyst thickness of 2 nm on the whisker. The surface area of the whiskers depends upon the whisker cross-sectional dimension, whisker length, and whisker areal number density (number of whiskers per unit area of backing). In some embodiments, the surface area of the whiskers is in a range from 1 to 100 cm$^2$ per cm$^2$ of backing surface area (in some embodiments, in a range from 2 to 50 cm$^2$ per cm$^2$, 5 to 25 cm$^2$ per cm$^2$, or even 5 to 15 cm$^2$ per cm$^2$). In some embodiments, the backing may have a surface area in a range of 1 to 10 cm$^2$ per cm$^2$ planar backing area (in some embodiments, in a range from 1 to 5 cm$^2$ per cm$^2$, or even in a range from 1 to 2 cm$^2$ per cm$^2$). The combined surface area of the whiskers and the backing is the product of the whisker surface area and the backing surface area. For example, whiskers which have a surface area of 10 cm$^2$ per cm$^2$ backing area on a backing which has a surface area of 1.5 cm$^2$ of surface area per cm$^2$ planar backing area, will yield a combined surface area of 15 cm$^2$ of combined surface area per cm$^2$ planar backing area.

In some embodiments, methods for making catalyst material herein comprise annealing the catalyst. In general, annealing can be done by techniques known in the art, including heating the catalyst material via, for example, in an oven or furnace, with a laser, and with infrared techniques. Annealing can be conducted, for example, in inert or reactive gas environments. Although not wanting to be bound by theory, it is believed annealing can induce structural changes on the atomic scale which can influence activity and durability of catalysts. Further, it is believed annealing nanoscale particles and films can induce mobility in the atomic constituent(s), which can cause growth of particles or thin film grains. In the case of multi-element mixtures, alloys, or layered particles and films, it is believed annealing can induce, for example, segregation of components within the particle or film to the surface, formation of random, disordered alloys, and formation of ordered intermetallics, depending upon the component element properties and the annealing environment. For additional details regarding annealing see, for example, van der Vliet et al., Nature Materials, 2012, 11, pp. 1051-1058; Wang et al., Nature Materials, 2013, 12, pp. 81-87, and U.S. Pat. No. 8,748,330 B2 (Debe et al.), the disclosures of which are incorporated herein by reference.

In some embodiments, the catalyst is essentially nonporous (i.e., the catalyst contains spherical and/or aspherical void volume, wherein the void volume is at least 75% contained within the catalyst thin film (in some embodiments, 85, 90, 95, 99, or even 100% contained within the catalyst thin film), and wherein the average diameter of the void volume is less than 1 nm (in some embodiments, less than 0.8 nm, 0.6 nm, 0.4 nm, 0.2 nm, or even 0.01 nm)).

In some embodiments, methods for making catalyst described herein comprise depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, methods for making catalyst described herein comprise annealing at least one of the layers.

In another aspect, the present disclosure provides a method of making articles described herein, the method comprising depositing any of the layers onto microstructured whiskers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition. In some embodiments, the method further comprises annealing at least one of the layers.

In some embodiments, methods for making the catalyst described herein comprises electrochemically cycling the catalyst. In some embodiments, methods for making the catalyst described herein comprise cycling the catalyst in an acidic electrolyte. In some embodiments, methods for making the catalyst described herein comprise cycling the catalyst between 0.60 and 1.00 V versus the potential of a standard hydrogen electrode. Such techniques are generally known in the art (also see, for example, application having U.S. Ser. No. 62/657,184, filed Apr. 13, 2018), the disclosure of which is incorporated herein by reference.

In some embodiments, the microstructured whiskers are attached to a backing (e.g., a membrane). In some embodiments, wherein the backing has a microstructure on at least one of its surfaces.

Catalysts described herein are useful, for example, in fuel cell membrane electrode assemblies (MEAs). "Membrane electrode assembly" refers to a layered sandwich of fuel cell materials comprising a membrane, anode and cathode electrode layers, and gas diffusion layers. Typically, the cathode catalyst layer comprises a catalyst described herein, although in some embodiments, the anode catalyst layer independently comprises a catalyst described herein.

In some embodiments, an article comprises the catalyst described herein. In some embodiments, the article comprises no electrically conductive carbon-based material.

An MEA comprises, in order:
- a first gas distribution layer having first and second opposed major surfaces;
- an anode catalyst layer having first and second opposed major surfaces, the anode catalyst comprising a first catalyst;
- an electrolyte membrane;
- a cathode catalyst layer having first and second opposed major surfaces, the cathode catalyst comprising a second catalyst; and
- a second gas distribution layer having first and second opposed major surfaces.

Electrolyte membranes conduct reaction intermediate ions between the anode and cathode catalyst layers. Electrolyte membranes preferably have high durability in the electrochemical environment, including chemical and electrochemical oxidative stability. Electrolyte membranes preferably have low ionic resistance for the transport of the reaction intermediate ions, but are relatively impermeable barriers for other ions, electrons, and reactant species. In some embodiments, the electrolyte membrane is a proton exchange membrane (PEM), which conducts cations. In PEM fuel cells, the electrolyte membrane preferably conducts protons. PEMs are typically a partially fluorinated or perfluorinated polymer comprised of a structural backbone and pendant cation exchange groups, PEMs are available, for example, from E. I. du Pont de Nemours and Company, Wilmington, Del., under the trade designation "NAFION;"

Solvay, Brussels, Belgium, under the trade designation "AQUIVION;" 3M Company, St. Paul, Minn., under the designation "3M PFSA MEMBRANE;" and Asahi Glass Co., Tokyo, Japan, under the trade designation "FLEMION."

A gas distribution layer generally delivers gas evenly to the electrodes and, in some embodiments, conducts electricity. It also provides for removal of water in either vapor or liquid form, in the case of a fuel cell. Gas distribution layers are typically porous to allow reactant and product transport between the electrodes and the flow field. Sources of gas distribution layers include carbon fibers randomly oriented to form porous layers, in the form of non-woven paper or woven fabrics. The non-woven carbon papers are available, for example, from Mitsubishi Rayon Co., Ltd., Tokyo, Japan, under the trade designation "GRAFIL U-105;" Toray Corp., Tokyo, Japan, under the trade designation "TORAY;" AvCarb Material Solutions, Lowell, Mass., under the trade designation "AVCARB;" SGL Group, the Carbon Company, Wiesbaden, Germany, under the trade designation "SIGRACET;" Freudenberg FCCT SE & Co. KG, Fuel Cell Component Technologies, Weinheim, Germany, under the trade designation "FREUDENBERG;" and Engineered Fibers Technology (EFT), Shelton, Conn., under the trade designation "SPECTRACARB GDL." The woven carbon fabrics or cloths are available, for example, from ElectroChem Inc., Woburn, Mass., under the trade designations "EC-CC1-060" and "EC-AC-CLOTH;" NuVant Systems Inc., Crown Point, Ind., under the trade designations "ELAT-LT" and "ELAT;" BASF Fuel Cell GmbH, North America, under the trade designation "E-TEK ELAT LT;" and Zoltek Corp., St. Louis, Mo., under the trade designation "ZOLTEK CARBON CLOTH." The non-woven paper or woven fabrics can be treated to modify its hydrophobicity (e.g., treatment with a polytetrafluoroethylene (PTFE) suspension with subsequent drying and annealing). Gas dispersion layers often comprise a porous layer of sub-micrometer electronically-conductive particles (e.g., carbon), and a binder (e.g., PTFE). Although not wanting to be bound by theory, it is believed that gas dispersion layers facilitate reactant and product water transport between the electrode and the gas distribution layers.

At least one of the anode or cathode catalyst is catalyst described herein. The "other catalyst layer" can be a conventional catalyst known in the art and provided by techniques known in the art (e.g., U.S. Pat. No. 5,759,944 (Buchanan et al.), U.S. Pat. No. 5,068,161 (Keck et al.), and U.S. Pat. No. 4,447,506 (Luczak et al.)), the disclosures of which are incorporated herein by reference.

A fuel cell is an electrochemical device that combines hydrogen fuel and oxygen from the air to produce electricity, heat, and water. Fuel cells do not utilize combustion, and as such, fuel cells produce little if any hazardous effluents. Fuel cells convert hydrogen fuel and oxygen directly into electricity and can be operated at much higher efficiencies than internal combustion electric generators, for example.

Referring to FIG. 2, exemplary fuel cell 200 includes first gas distribution layer 201 adjacent to anode 203. Adjacent anode 203 is an electrolyte membrane 204. Cathode 205 is situated adjacent the electrolyte membrane 204, and second gas distribution layer 207 is situated adjacent cathode 205. In operation, hydrogen fuel is introduced into the anode portion of the fuel cell 200, passing through the first gas distribution layer 201 and over anode 203. At anode 203, the hydrogen fuel is separated into hydrogen ions (H$^+$) and electrons (e$^-$).

Electrolyte membrane 204 permits only the hydrogen ions or protons to pass through electrolyte membrane 204 to the cathode portion of fuel cell 200. The electrons cannot pass through the electrolyte membrane 204 and, instead, flow through an external electrical circuit in the form of electric current. This current can power an electric load 217, such as an electric motor, or be directed to an energy storage device, such as a rechargeable battery.

Oxygen flows into the cathode side of fuel cell 200 via second distribution layer 207. As the oxygen passes over cathode 205, oxygen, protons, and electrons combine to produce water and heat.

EXEMPLARY EMBODIMENTS

1A. A catalyst comprising a first layer comprising a first material, wherein the first material comprises at least one Ti, W, Hf, Zr, of Nb, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the at least one of Ti, W, Hf, Zr, of Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, 0.28:1 to 9.04:1, 1.74:1 to 9.04:1, 0.98:1 to 1.41:1, or even 1.16:1 to 2.80:1).

2A. The catalyst of Exemplary Embodiment 1A, wherein the first material comprises Ti, and wherein the Pt and Ti are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 0.27:1 to 1.07:1).

3A. The catalyst of Exemplary Embodiment 1A, wherein the first material comprises W, and wherein the Pt and W are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 0.24:1 to 0.94:1).

1B. A catalyst comprising a first layer comprising a first material, wherein the first material comprises at least one of Ta, Ti, W, Hf, Zr, or Nb, and at least one of O, N, or C, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the at least one of Ta, Ti, W, Hf, Zr, or Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

2B. The catalyst of Exemplary Embodiment 1B, wherein the first material comprises at least one oxide of the at least one of Ta, Ti, W, Hf, Zr, or Nb.

3B. The catalyst of Exemplary Embodiment 2B, wherein the atomic ratio of the at least one of Ta, Ti, W, Hf, Zr, or Nb collectively to O is in a range from 0.1:1 to 100:1 (in some embodiments, in a range from 0.5:1 to 99:1, 0.5:1 to 19:1, 0.5:1 to 10:1, 0.5:1 to 8:1, 0.5:1 to 6:1, 0.5:1 to 4:1, 0.5:1 to 3:1, 0.5:1 to 2:1, 1:1 to 2:1, or even 0.5:1 to 1:1).

4B. The catalyst of Exemplary Embodiment 2B, wherein the atomic ratio of the at least one of Ta, Ti, W, Hf, Zr, or Nb collectively to O is less than 0.5:1 (in some embodiments, less than 1:1, 2:1, 5:1, 10:1, or even less than 100:1).

5B. The catalyst of Exemplary Embodiment 1B, wherein the first material comprises the Ta and the O in the form of at least tantalum oxide.

6B. The catalyst of Exemplary Embodiment 5B, wherein the atomic ratio of the Pt to Ta are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 1.16:1 to 2.32:1).

7B. The catalyst of Exemplary Embodiment 1B, wherein the first material comprises the Ta and the Ti, and wherein the Ta to Ti atomic ratio is in a range from 0.01:1 to 100:1 (in some embodiments, in a range from 0.01:1 to 50:1, 0.01:1 to 33:1, 0.01:1 to 20:1, 0.01:1 to 10:1, 0.01:1 to 5:1, 0.01:1 to 3.3:1, 0.01:1 to 2:1, 0.01:1 to 1:1, 0.1:1 to 1:1, 0.1:1 to 0.5:1, or even 0.11:1 to 0.44:1).

8B. The catalyst of Exemplary Embodiment 7B, wherein the first material further comprises the O in the form of at least one of tantalum-doped titanium dioxide or and niobium-doped titanium dioxide.

9B. The catalyst of any preceding B Exemplary Embodiment, wherein the first material is an electronic conductive oxide.

10B. The catalyst of Exemplary Embodiment 9B, wherein the electronic conductive oxide is corrosion tolerant.

11B. The catalyst of Exemplary Embodiment 1B, wherein the first material comprises the at least one of Ta, Ti, W, Hf, Zr, or Nb and the N in the form of at least one nitride.

12B. The catalyst of Exemplary Embodiment 11B, wherein the atomic ratio of the at least one of Ta, Ti, W, Hf, Zr, or Nb collectively to N is in the range from 0.1:1 to 100:1 (in some embodiments, in a range from 0.5:1 to 99:1, 0.5:1 to 19:1, 0.5:1 to 10:1, 0.5:1 to 8:1, 0.5:1 to 6:1, 0.5:1 to 4:1, 0.5:1 to 3:1, 0.5:1 to 2:1, 1:1 to 2:1, or even 0.5:1 to 1:1).

13B. The catalyst of Exemplary Embodiment 1B, wherein the first material comprises the Ti and the N in the form of at least titanium nitride.

14B. The catalyst of Exemplary Embodiment 13B, wherein the atomic ratio of the Pt to Ti is in a range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 1:1).

15B. The catalyst of Exemplary Embodiment 1B, wherein the first material comprises the Ta and the N in the form of at least tantalum nitride.

16B. The catalyst of Exemplary Embodiment 15B, wherein the atomic ratio of Pt to Ta is in a range from 0.01:1 to 10:1 (in some embodiments, from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, 1:1 to 2:1, or even 2.30:1 to 2.34:1).

17B. The catalyst of Exemplary Embodiment 1B, wherein the first material comprises the at least one of Ta, Ti, W, Hf, Zr, or Nb and the C in the form of at least one carbide.

18B. The catalyst of Exemplary Embodiment 17B, wherein the atomic ratio of the at least one of Ta, Ti, W, Hf, Zr, or Nb collectively to C is in the range from 0.1:1 to 100:1 (in some embodiments, in a range from 0.5:1 to 99:1, 0.5:1 to 19:1, 0.5:1 to 10:1, 0.5:1 to 8:1, 0.5:1 to 6:1, 0.5:1 to 4:1, 0.5:1 to 3:1, 0.5:1 to 2:1, 1:1 to 2:1, or even 0.5:1 to 1:1).

19B. The catalyst of Exemplary Embodiment 1B, wherein the first material comprises the Ti, the O, and the N in the form of at least titanium oxynitride.

1C. A catalyst comprising a first layer comprising a first material, wherein the first material comprises at least one of Ta, Ti, W, Hf, Zr, or Nb, and at least one of Ni, Co, Fe, Mn, Ir, or Pt, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and at least one of Ta, Ti, W, Hf, Zr, or Nb collectively are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

2C. The catalyst of Exemplary Embodiment 1C, wherein the atomic ratio of the at least one of Ta, Ti, W, Hf, Zr, or Nb collectively to the at least one of Ni, Co, Fe, Mn, Ir, or Pt, collectively is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.1:1 to 10:1, or even 0.5:1 to 5:1).

3C. The catalyst of any preceding C Exemplary Embodiment, wherein the first material comprises the at least one of Ta, Ti, W, Hf, Zr, or Nb, and the at least one of Ni, Co, Fe, Mn, Ir, or Pt, in the form of at least one oxide.

4C. The catalyst of Exemplary Embodiment 3C, wherein the first layer comprises the Ta and the Ir.

5C. The catalyst of Exemplary Embodiment 4C, wherein the Ta to Ir atomic ratio is in a range from 0.1:1 to 10:1 (in some embodiments, in a range from 0:5:1 to 10:1 or even 0.71:1 to 9:41:1).

6C. The catalyst of Exemplary Embodiment 1C, wherein the first layer comprises the Ta and the Ni.

7C. The catalyst of Exemplary Embodiment 6C, wherein the Ta to Ni atomic ratio is in a range from 0.01:1 to 10:1 (in some embodiments, in a range from 0.05:1 to 1:1, 0.05:1 to 0.5:1, or even 0.08:1 to 0.24:1).

8C. The catalyst of Exemplary Embodiment 1C, wherein the first layer comprises a mixed metal oxide comprising at least one of Pt or Ir and at least one of an oxide of Ta, Ti, W, Hf, Zr, or Nb (e.g., $IrO_2$—$Ta_2O_5$, $PtO_2$—$Ta_2O_5$, $IrO_2$—$TiO_2$, $PtO_2$—$TiO_2$, $IrO_2$—$WO_3$, $PtO_2$—$WO_3$, $IrO_2$—$HfO_2$, $PtO_2$—$HfO_2$, $IrO_2$—$ZrO_2$, $PtO_2$—$ZrO_2$, $IrO_2$—$Nb_2O_5$, and $PtO_2$—$Nb_2O_5$).

1D. A catalyst comprising a first layer comprising a first material, wherein the first material comprises at least one of Pt or Ir, and at least one of Ni, Co, Fe or Mn, the first layer having an outer layer with a layer comprising Pt directly thereon, wherein the first layer has an average thickness in a range from 0.04 to 30 (in some embodiments, in a range from 0.04 to 20, 0.05 to 20, 0.05 to 10, 0.05 to 8, 0.05 to 6, 0.05 to 5, 0.05 to 4, 0.05 to 3, 0.05 to 2, or even 0.05 to 1) nanometers, wherein the layer comprising Pt has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, or even 0.04 to 0.5) nanometers, and wherein the Pt and the collective metal content within the first material are present in an atomic ratio range from 0.01:1 to 10:1 (in some embodiments, in a range from 0.05:1 to 10:1, 0.1:1 to 10:1, 0.5:1 to 10:1, 1:1 to 10:1, 2:1 to 10:1, 3:1 to 10:1, 4:1 to 10:1, 5:1 to 10:1, 7.5:1 to 10:1, 0.05:1 to 5:1, 0.1:1 to 5:1, 0.5:1 to 5:1, 1:1 to 5:1, 2:1 to 5:1, 3:1 to 5:1, 4:1 to 5:1, 0.05:1 to 4:1, 0.1:1 to 4:1, 0.5:1 to 4:1, 1:1 to 4:1, 2:1 to 4:1, 3:1 to 4:1, 0.05:1 to 3:1, 0.1:1 to 3:1, 0.5:1 to 3:1, 1:1 to 3:1, 2:1 to 3:1, 0.05:1 to 2:1, 0.1:1 to 2:1, 0.5:1 to 2:1, or even 1:1 to 2:1).

2D. The catalyst of Exemplary Embodiment 1D, wherein the atomic ratio of the at least one of Pt or Ir collectively to the at least one of Ni, Co, Fe, Mn collectively is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.1:1 to 10:1, or even 0.5:1 to 5:1).

3D. The catalyst of any preceding D Exemplary Embodiment, wherein the first layer comprises the Ir and the Ni.

4D. The catalyst of Exemplary Embodiment 3D, wherein the Ir to Ni atomic ratio is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.1:1 to 10:1, or even 0.06:1 to 0.74:1).

1E. The catalyst of any preceding A, B, C, or D Exemplary Embodiment, wherein the catalyst surface area is at least 5 (in some embodiments, at least 6, 7, 8, 9, 10, 11, 12, 13, 14, 15, 20, 25, 30, 35, 40, 45, or even at least 49) percent greater than would be present without the presence of the first layer.

2E. The catalyst of any preceding A, B, C or D Exemplary Embodiment, further comprising at least one pair of alternating layers, wherein the first alternating layer comprises the first material, and wherein the second alternating layer comprises Pt.

3E. The catalyst of any preceding A, B, C or D Exemplary Embodiment, wherein a layer of Ir is present between the first layer and the Pt layer, and wherein the layer comprising Ir has an average thickness in a range from 0.04 to 50 (in some embodiments, in a range from 0.04 to 40, 0.04 to 30, 0.04 to 20, 0.04 to 10, 0.04 to 5, 0.04 to 4, 0.04 to 3, 0.04 to 2, 0.04 to 1, 0.04 to 0.63, 0.04 to 0.32, 0.04 to 0.16, or even 0.16 to 0.63) nanometers.

4E. The catalyst of Exemplary Embodiment 3E, wherein the atomic ratio of the first material to Ir is in a range from 0.01:1 to 100:1 (in some embodiments, in a range from 0.1:1 to 9:1, 0.33:1 to 3:1, 0.5:1 to 2:1, or even 0.59:1 to 2.35:1).

5E. The catalyst of any preceding E Exemplary Embodiment, wherein the layer comprising Pt further comprises Ni.

6E. The catalyst of Exemplary Embodiment 5E, wherein the Pt to Ni atomic ratio is in a range from 0.5:1 to 5:1 (in some embodiments, in a range from 0.5:1 to 2:1, 0.5:1 to 1:1, 0.57:1 to 0.69:1, or even 0.60:1).

7E. The catalyst of any preceding E Exemplary Embodiment, wherein the first layer has an electronic conductivity of at least $1\times10^3$ S/m (in some embodiments, the first layer has a conductivity of at least $1\times10^4$, $1\times10^5$, or even $1\times10^6$ S/m).

1F. A method of making the catalyst of any preceding A-E Exemplary Embodiment, the method comprising depositing any of the layers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition.

2F. The method of Exemplary Embodiment 1F, further comprising annealing at least one of the layers.

3F. The method of Exemplary Embodiment 1F, wherein depositing a layer comprising Pt via metal organic chemical vapor deposition further comprises using a dimethyl(1,5-cyclooctadiene) platinum (II) precursor.

4F. The method of Exemplary Embodiment 1F, wherein depositing a layer comprising Ta via metal organic chemical vapor deposition further comprises using a tantalum (V) ethoxide precursor.

5F. The method of either Exemplary Embodiment 3F or 4F, further comprising depositing with Ar and $H_2$ wherein the atomic ratio of Ar to $H_2$ is in a range from 1:1 to 100:1 (in some embodiments, in a range from 1:1 to 50:1, 1:1 to 25:1, 5:1 to 20:1, or even 10:1).

6F. The method of Exemplary Embodiment 1F, wherein depositing a layer comprising at least one of Ta, Ti, W, Hf, Zr, or Nb via reactive sputtering comprises sputtering with Ar and at least one of $N_2$ or $O_2$.

7F. The method of Exemplary Embodiment 6F, wherein the atomic ratio of Ar to $O_2$ is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.10:1 to 10:1, 0.50:1 to 5:1, 1:1 to 10:1, or even 5:1).

8F. The method of Exemplary Embodiment 7F, wherein the atomic ratio of Ar to $N_2$ is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.10:1 to 10:1, 0.50:1 to 5:1, 1:1 to 10:1, or even 7.4:1).

1G. An article comprising nanostructured elements comprising microstructured whiskers having an outer surface having the catalyst of any preceding A-E Exemplary Embodiment thereon.

2G. The article of Exemplary Embodiment 1G, wherein the first layer is directly on the microstructured whiskers.

3G. The article of either Exemplary Embodiment 1G or 2G, further comprising at least one pair of alternating layers disposed between the outer surface of the microstructured whiskers and the first layer, wherein the first alternating layer comprises the first material and is directly on the microstructured whiskers, and wherein the second alternating layer comprises Pt.

4G. The article of any preceding G Exemplary Embodiment, wherein the microstructured whiskers are attached to a backing (e.g., a membrane).

5G. The article of Exemplary Embodiment 4G, wherein the backing has a microstructure on at least one of its surfaces.

6G. The article according to any preceding G Exemplary Embodiment which comprises no electrically conductive carbon-based material.

1H. A method of making the article of any preceding G Exemplary Embodiment, the method comprising depositing any of the layers onto microstructured whiskers via a deposition technique independently selected from the group consisting of sputtering (including reactive sputtering), atomic layer deposition, metal organic chemical vapor deposition, molecular beam epitaxy, ion soft landing, thermal physical vapor deposition, vacuum deposition by electrospray ionization, and pulse laser deposition.

2H. The method of Exemplary Embodiment 1H, further comprising annealing at least one of the layers.

3H. The method of Exemplary Embodiment 1H, wherein depositing a layer comprising Pt via metal organic chemical vapor deposition further comprises using a dimethyl(1,5-cyclooctadiene) platinum (II) precursor.

4H. The method of Exemplary Embodiment 1H, wherein depositing a layer comprising Ta via metal organic chemical vapor deposition further comprises using a tantalum (V) ethoxide precursor.

5H. The method of either Exemplary Embodiment 3H or 4H, further comprising depositing with Ar and $H_2$ wherein the atomic ratio of Ar to $H_2$ is in a range from 1:1 to 100:1 (in some embodiments, in a range from 1:1 to 50:1, 1:1 to 25:1, 5:1 to 20:1, or even 10:1).

6H. The method of Exemplary Embodiment 1H, wherein depositing a layer comprising at least one of Ta, Ti, W, Hf, Zr, or Nb via reactive sputtering comprises sputtering with Ar and at least one of $N_2$ or $O_2$.

7H. The method of Exemplary Embodiment 6H, wherein the atomic ratio of Ar to $O_2$ is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.10:1 to 10:1, 0.50:1 to 5:1, 1:1 to 10:1, or even 5:1).

8H. The method of Exemplary Embodiment 7H, wherein the atomic ratio of Ar to $N_2$ is in a range from 0.01:1 to 100:1 (in some embodiments, in a range from 0.05:1 to 100:1, 0.1:1 to 100:1, 0.5:1 to 100:1, 1:1 to 100:1, 5:1 to 100:1, 10:1 to 100:1, 50:1 to 100:1, 0.01:1 to 50:1, 0.01:1 to 10:1, 0.01:1 to 5:1, 0.01:1 to 1:1, 0.01:1 to 0.5:1, 0.01:1 to 0.1:1, 0.01:1 to 0.05:1, 0.05:1 to 50:1, 0.10:1 to 10:1, 0.50:1 to 5:1, 1:1 to 10:1, or even 7.4:1).

11. A method for making the catalyst of any preceding A-E Exemplary Embodiment, the method comprising electrochemically cycling the catalyst.

21. The method of Exemplary Embodiment 11, further comprising cycling the catalyst in an acidic electrolyte.

31. The method of either Exemplary Embodiment 11 or 21, further comprising cycling the catalyst in a range from 0.60 to 1.00 V versus the potential of a standard hydrogen electrode.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Preparatory Example A

Microstructured whiskers employed as catalyst supports were made according to the process described in U.S. Pat. No. 5,338,430 (Parsonage et al.), U.S. Pat. No. 4,812,352 (Debe), and U.S. Pat. No. 5,039,561 (Debe), incorporated herein by reference, using as substrates the microstructured catalyst transfer substrates (or MCTS) described in U.S. Pat. No. 6,136,412 (Spiewak et al.), also incorporated herein by reference. Perylene red pigment (i.e., N,N'-di(3,5-xylyl) perylene-3,4:9,10-bis(dicarboximide)) (C.I. Pigment Red 149, also known as "PR149", obtained from Clariant, Charlotte, N.C.) was sublimation vacuum coated onto MCTS with a nominal thickness of 200 nm, after which it was annealed. After deposition and annealing, highly oriented crystal structures were formed with large aspect ratios, controllable lengths of about 0.5 to 2 micrometers, widths of about 0.03-0.05 micrometer and areal number density of about 30 whiskers per square micrometer, oriented substantially normal to the underlying substrate.

Comparative Example A

Nanostructured thin film (NSTF) catalyst layers were prepared by sputter coating catalyst films sequentially using a DC-magnetron physical vapor deposition (PVD) sputtering process onto the layer of microstructured whiskers, Preparatory Example A. A vacuum sputter deposition system was used with typical sputter gas pressures of about 3.3 mTorr (0.44 Pa), and a 5-inch×15-inch (12.7 cm×38.1 cm) rectangular Pt sputter target. The system base pressure was typically $2.5 \times 10^{-5}$ Torr (0.0033 Pa), and the typically determined background gas was water vapor. The coatings were deposited by using ultra high purity Ar as the sputtering gas.

A single Pt layer with planar equivalent thickness of about 0.09 nm was first deposited onto the whiskers on MCTS from a pure Pt target. The Pt deposition process was repeated 50 times. The resultant deposition consisted of a single, contiguous Pt thin film with an overall contiguous Pt planar equivalent thickness of about 4.7 nm, summarized in Table 1, below.

TABLE 1

| Example | Structure | Process | Contiguous Planar Equivalent Thickness, nm | | | | | | |
|---|---|---|---|---|---|---|---|---|---|
| | | | Pt | Ni | Ta | Ti | W | Ir | All |
| Comparative Example A | Pt | PVD (Ar) | 4.7 | 0.0 | 0.0 | 0.0 | 0.0 | 0.0 | 4.7 |
| Comparative Example B | Pt | PVD (Ar) | 9.3 | 0.0 | 0.0 | 0.0 | 0.0 | 0.0 | 9.3 |
| Comparative Example C | Pt | PVD (Ar) | 11.7 | 0.0 | 0.0 | 0.0 | 0.0 | 0.0 | 11.7 |
| Comparative Example D | Pt | PVD (Ar) | 23.3 | 0.0 | 0.0 | 0.0 | 0.0 | 0.0 | 23.3 |
| Comparative Example E | Pt | PVD (Ar) | 46.6 | 0.0 | 0.0 | 0.0 | 0.0 | 0.0 | 46.6 |
| Example 1 | Pt/Ti | PVD (Ar) | 4.7 | 0.0 | 0.0 | 5.1 | 0.0 | 0.0 | 9.8 |
| Example 2 | Pt/Ti | PVD (Ar) | 4.7 | 0.0 | 0.0 | 20.0 | 0.0 | 0.0 | 24.6 |
| Example 3 | Pt/W | PVD (Ar) | 4.7 | 0.0 | 0.0 | 0.0 | 5.2 | 0.0 | 9.8 |
| Example 4 | Pt/W | PVD (Ar) | 4.7 | 0.0 | 0.0 | 0.0 | 20.2 | 0.0 | 24.9 |
| Example 5 | Pt/TaOx | PVD ($O_2$) | 4.7 | 0.0 | 4.9 | 0.0 | 0.0 | 0.0 | 9.5 |
| Example 6 | Pt/TaOx | PVD ($O_2$) | 9.3 | 0.0 | 4.9 | 0.0 | 0.0 | 0.0 | 14.2 |
| Example 7 | Pt/TaN | PVD ($N_2$) | 9.3 | 0.0 | 4.9 | 0.0 | 0.0 | 0.0 | 14.2 |
| Example 8 | Pt/TiN | PVD ($N_2$) | 9.3 | 0.0 | 0.0 | 11.1 | 0.0 | 0.0 | 20.4 |
| Example 9 | Pt/Ta | MOCVD ($H_2$) | 2.3 | 0.0 | 4.9 | 0.0 | 0.0 | 0.0 | 7.2 |
| Example 10 | Pt/Ta | MOCVD ($H_2$) | 4.7 | 0.0 | 4.9 | 0.0 | 0.0 | 0.0 | 9.5 |
| Example 11 | Pt/TaTi | PVD (Ar) | 9.3 | 0.0 | 30.5 | 266.3 | 0.0 | 0.0 | 306.1 |
| Example 12 | Pt/TaTi | PVD (Ar) | 9.3 | 0.0 | 30.5 | 117.6 | 0.0 | 0.0 | 157.4 |
| Example 13 | Pt/TaTi | PVD (Ar) | 9.3 | 0.0 | 30.5 | 66.6 | 0.0 | 0.0 | 106.4 |
| Example 14 | Pt/TaTi | PVD (Ar) | 9.3 | 0.0 | 5.7 | 22.2 | 0.0 | 0.0 | 37.2 |
| Example 15 | Pt/TaTi | PVD (Ar) | 9.3 | 0.0 | 11.6 | 44.4 | 0.0 | 0.0 | 65.3 |
| Example 16 | Pt/TaNi | PVD (Ar) | 21.9 | 19.6 | 7.9 | 0.0 | 0.0 | 0.0 | 49.5 |
| Example 17 | Pt/TaIr | PVD (Ar) | 21.9 | 0.0 | 20.4 | 0.0 | 0.0 | 22.2 | 64.5 |
| Example 18 | Pt/IrNi | PVD (Ar) | 21.9 | 23.0 | 0.0 | 0.0 | 0.0 | 22.2 | 67.1 |

The areal Pt loading of a Pt layer is determined by multiplying the planar equivalent thickness by the density of the layer. The areal Pt loading of Comparative Example A, summarized in Table 2, below, was 10 micrograms per $cm^2$ planar area, determined by multiplying 4.7 nm by the density of Pt, 2.145 micrograms per $nm^3$. Comparative Example A did not contain Ni, Ta, Ti, W, or Ir, and the Pt mole fraction of was 1.00.

Table 3, below, summarizes the atomic ratios of Pt to Ta, Pt to Ti, Pt to W, and Pt to collective underlayer metal (Ta, Ti, W, Ni, and Ir), based on the compositions from Table 2, above. Table 3 also summarizes the atomic ratios of Ta to Ir, Ta to Ti, Ta to Ni, and Ir to Ni. Comparative Example A did not contain Ni, Ta, Ti, W, or Ir, and the atomic ratios were either infinite (division by 0) or undefined (0/0, denoted by "-").

TABLE 2

| Example | Target Loading, microgram/$cm^2$ | | | | | | Target Mole Fraction | | | | | |
|---|---|---|---|---|---|---|---|---|---|---|---|---|
| | Pt | Ni | Ta | Ti | W | Ir | Pt | Ni | Ta | Ti | W | Ir |
| Comparative Example A | 10 | 0 | 0 | 0 | 0 | 0 | 1.00 | 0.00 | 0.00 | 0.00 | 0.00 | 0.00 |
| Comparative Example B | 20 | 0 | 0 | 0 | 0 | 0 | 1.00 | 0.00 | 0.00 | 0.00 | 0.00 | 0.00 |
| Comparative Example C | 25 | 0 | 0 | 0 | 0 | 0 | 1.00 | 0.00 | 0.00 | 0.00 | 0.00 | 0.00 |
| Comparative Example D | 50 | 0 | 0 | 0 | 0 | 0 | 1.00 | 0.00 | 0.00 | 0.00 | 0.00 | 0.00 |
| Comparative Example E | 100 | 0 | 0 | 0 | 0 | 0 | 1.00 | 0.00 | 0.00 | 0.00 | 0.00 | 0.00 |
| Example 1 | 10 | 0 | 0 | 2.3 | 0 | 0 | 0.52 | 0.00 | 0.00 | 0.48 | 0.00 | 0.00 |
| Example 2 | 10 | 0 | 0 | 9 | 0 | 0 | 0.21 | 0.00 | 0.00 | 0.79 | 0.00 | 0.00 |
| Example 3 | 10 | 0 | 0 | 0 | 10 | 0 | 0.49 | 0.00 | 0.00 | 0.00 | 0.51 | 0.00 |
| Example 4 | 10 | 0 | 0 | 0 | 39 | 0 | 0.19 | 0.00 | 0.00 | 0.00 | 0.81 | 0.00 |
| Example 5 | 10 | 0 | 8 | 0 | 0 | 0 | 0.54 | 0.00 | 0.46 | 0.00 | 0.00 | 0.00 |
| Example 6 | 20 | 0 | 8 | 0 | 0 | 0 | 0.70 | 0.00 | 0.30 | 0.00 | 0.00 | 0.00 |
| Example 7 | 20 | 0 | 8 | 0 | 0 | 0 | 0.70 | 0.00 | 0.30 | 0.00 | 0.00 | 0.00 |
| Example 8 | 20 | 0 | 0 | 5 | 0 | 0 | 0.50 | 0.00 | 0.00 | 0.50 | 0.00 | 0.00 |
| Example 9 | 5 | 0 | 8 | 0 | 0 | 0 | 0.37 | 0.00 | 0.63 | 0.00 | 0.00 | 0.00 |
| Example 10 | 10 | 0 | 8 | 0 | 0 | 0 | 0.54 | 0.00 | 0.46 | 0.00 | 0.00 | 0.00 |
| Example 11 | 20 | 0 | 50 | 120 | 0 | 0 | 0.04 | 0.00 | 0.10 | 0.87 | 0.00 | 0.00 |
| Example 12 | 20 | 0 | 50 | 53 | 0 | 0 | 0.07 | 0.00 | 0.19 | 0.75 | 0.00 | 0.00 |
| Example 13 | 20 | 0 | 50 | 30 | 0 | 0 | 0.10 | 0.00 | 0.27 | 0.62 | 0.00 | 0.00 |
| Example 14 | 20 | 0 | 9.4 | 10 | 0 | 0 | 0.28 | 0.00 | 0.14 | 0.57 | 0.00 | 0.00 |
| Example 15 | 20 | 0 | 19 | 20 | 0 | 0 | 0.16 | 0.00 | 0.17 | 0.67 | 0.00 | 0.00 |
| Example 16 | 47 | 17.5 | 13 | 0 | 0 | 0 | 0.39 | 0.49 | 0.12 | 0.00 | 0.00 | 0.00 |
| Example 17 | 47 | 0 | 33.5 | 0 | 0 | 50 | 0.35 | 0.00 | 0.27 | 0.00 | 0.00 | 0.38 |
| Example 18 | 47 | 20.5 | 0 | 0 | 0 | 50 | 0.28 | 0.41 | 0.00 | 0.00 | 0.00 | 0.31 |

TABLE 3

| Example | Target Pt:Ta Atomic Ratio | Target Pt:Ti Atomic Ratio | Target Pt:W Atomic Ratio | Target Pt to Collective Underlayer Metal Atomic Ratio | Target Ta:Ir Atomic Ratio | Target Ta:Ti Atomic Ratio | Target Ta:Ni Atomic Ratio | Target Ir:Ni Atomic Ratio |
|---|---|---|---|---|---|---|---|---|
| Comparative Example A | Infinite | Infinite | Infinite | Infinite | — | — | — | — |
| Comparative Example B | Infinite | Infinite | Infinite | Infinite | — | — | — | — |
| Comparative Example C | Infinite | Infinite | Infinite | Infinite | — | — | — | — |
| Comparative Example D | Infinite | Infinite | Infinite | Infinite | — | — | — | — |
| Comparative Example E | Infinite | Infinite | Infinite | Infinite | — | — | — | — |
| Example 1 | Infinite | 1.07 | Infinite | 1.07 | — | 0.00 | — | — |
| Example 2 | Infinite | 0.27 | Infinite | 0.27 | — | 0.00 | — | — |
| Example 3 | Infinite | Infinite | 0.94 | 0.94 | — | — | — | — |
| Example 4 | Infinite | Infinite | 0.24 | 0.24 | — | — | — | — |
| Example 5 | 1.16 | Infinite | Infinite | 1.16 | — | Infinite | Infinite | — |
| Example 6 | 2.32 | Infinite | Infinite | 2.32 | — | Infinite | Infinite | — |
| Example 7 | 2.32 | Infinite | Infinite | 2.32 | — | Infinite | Infinite | — |
| Example 8 | Infinite | 0.98 | Infinite | 0.98 | — | 0.00 | — | — |
| Example 9 | 0.58 | Infinite | Infinite | 0.58 | — | Infinite | Infinite | — |
| Example 10 | 1.16 | Infinite | Infinite | 0.46 | — | Infinite | Infinite | — |
| Example 11 | 0.37 | 0.04 | Infinite | 0.04 | — | 0.11 | Infinite | — |
| Example 12 | 0.37 | 0.09 | Infinite | 0.07 | — | 0.25 | Infinite | — |
| Example 13 | 0.37 | 0.16 | Infinite | 0.11 | — | 0.44 | Infinite | — |
| Example 14 | 1.97 | 0.49 | Infinite | 0.39 | — | 0.25 | Infinite | — |
| Example 15 | 0.98 | 0.25 | Infinite | 0.20 | — | 0.25 | Infinite | — |
| Example 16 | 3.35 | Infinite | Infinite | 0.65 | — | Infinite | 0.24 | — |
| Example 17 | 1.30 | Infinite | Infinite | 0.54 | 0.71 | Infinite | Infinite | Infinite |
| Example 18 | Infinite | Infinite | Infinite | 0.40 | — | — | — | 0.74 |

The metal was deposited onto the NSTF support-coated MCTS substrate, which has intrinsic roughness. The thickness of the metal film on the support is thinner than the planar equivalent thickness by the factor of the overall support and substrate roughness factor. The NSTF support is estimated to provide 10 cm$^2$ of surface area per cm$^2$ of planar area, and the MCTS provided an additional 1.4 cm$^2$ of surface area, and as such the overall surface area was 14 cm$^2$. 4.7 nm planar equivalent thickness spread over 14 cm$^2$/cm$^2$ was about 0.33 nm. The metal thickness on the support of Comparative Example A, 0.33 nm, is summarized in Table 4, below.

TABLE 4

| | Contiguous Thickness on Support, nm | | | | | | |
|---|---|---|---|---|---|---|---|
| Example | Pt | Ni | Ta | Ti | W | Ir | All |
| Comparative Example A | 0.33 | 0.00 | 0.00 | 0.00 | 0.00 | 0.00 | 0.33 |
| Comparative Example B | 0.67 | 0.00 | 0.00 | 0.00 | 0.00 | 0.00 | 0.67 |
| Comparative Example C | 0.83 | 0.00 | 0.00 | 0.00 | 0.00 | 0.00 | 0.83 |
| Comparative Example D | 1.67 | 0.00 | 0.00 | 0.00 | 0.00 | 0.00 | 1.67 |
| Comparative Example E | 3.33 | 0.00 | 0.00 | 0.00 | 0.00 | 0.00 | 3.33 |
| Example 1 | 0.33 | 0.00 | 0.00 | 0.36 | 0.00 | 0.00 | 0.70 |
| Example 2 | 0.33 | 0.00 | 0.00 | 1.43 | 0.00 | 0.00 | 1.76 |
| Example 3 | 0.33 | 0.00 | 0.00 | 0.00 | 0.37 | 0.00 | 0.70 |
| Example 4 | 0.33 | 0.00 | 0.00 | 0.00 | 1.44 | 0.00 | 1.78 |
| Example 5 | 0.33 | 0.00 | 0.35 | 0.00 | 0.00 | 0.00 | 0.68 |
| Example 6 | 0.67 | 0.00 | 0.35 | 0.00 | 0.00 | 0.00 | 1.01 |
| Example 7 | 0.67 | 0.00 | 0.35 | 0.00 | 0.00 | 0.00 | 1.01 |
| Example 8 | 0.67 | 0.00 | 0.00 | 0.79 | 0.00 | 0.00 | 1.46 |
| Example 9 | 0.17 | 0.00 | 0.35 | 0.00 | 0.00 | 0.00 | 0.51 |
| Example 10 | 0.33 | 0.00 | 0.35 | 0.00 | 0.00 | 0.00 | 0.68 |
| Example 11 | 0.67 | 0.00 | 2.18 | 19.02 | 0.00 | 0.00 | 21.87 |
| Example 12 | 0.67 | 0.00 | 2.18 | 8.40 | 0.00 | 0.00 | 11.25 |
| Example 13 | 0.67 | 0.00 | 2.18 | 4.76 | 0.00 | 0.00 | 7.60 |
| Example 14 | 0.67 | 0.00 | 0.41 | 1.59 | 0.00 | 0.00 | 2.66 |
| Example 15 | 0.67 | 0.00 | 0.83 | 3.17 | 0.00 | 0.00 | 4.66 |
| Example 16 | 1.57 | 1.40 | 0.57 | 0.00 | 0.00 | 0.00 | 3.53 |
| Example 17 | 1.57 | 0.00 | 1.46 | 0.00 | 0.00 | 1.58 | 4.61 |
| Example 18 | 1.57 | 1.64 | 0.00 | 0.00 | 0.00 | 1.58 | 4.79 |

Representative areas of the electrocatalyst were analyzed for bulk composition using X-Ray Fluorescence spectroscopy (XRF). Representative catalyst samples were evaluated on MCTS using a wavelength dispersive X-ray fluorescence spectrometer (obtained under the trade designation "PRIMUS II" from Rigaku Corporation, Tokyo, Japan) equipped with a rhodium (Rh) X-ray source, a vacuum atmosphere, and a 20-mm diameter measurement area. Each sample was analyzed three times to obtain the average and standard deviation for the measured Pt, Ni, Ta, Ti, W, and Ir signal intensities, which are proportional to loading. The electrocatalyst's Pt, Ni, Ta, Ti, W, and Ir loadings were determined by comparing their measured XRF intensities to the XRF intensities obtained with standard NSTF electrocatalysts containing Pt, Ni, Ta, Ti, W, and Ir with known areal loadings. From the XRF-determined Pt, Ni, Ta, and Ir loadings, the catalyst's composition was calculated. Loading and composition information for Comparative Example A is provided in Table 5, below. Comparative Example A contained 13.6 micrograms/cm$^2$ of Pt, and did not contain measurable Ni, Ta, Ti, W, or Ir.

TABLE 5

| Example | Loading, microgram/cm² | | | | | | Mole Fraction | | | | | |
|---|---|---|---|---|---|---|---|---|---|---|---|---|
| | Pt | Ni | Ta | Ti | W | Ir | Pt | Ni | Ta | Ti | W | Ir |
| Comparative Example A | 13.6 | | | | | | 1.00 | 0.00 | 0.00 | 0.00 | 0.00 | 0.00 |
| Comparative Example B | 23.8 | | | | | | 1.00 | 0.00 | 0.00 | 0.00 | 0.00 | 0.00 |
| Comparative Example C | 27.0 | | | | | | 1.00 | 0.00 | 0.00 | 0.00 | 0.00 | 0.00 |
| Comparative Example D | 54.2 | | | | | | 1.00 | 0.00 | 0.00 | 0.00 | 0.00 | 0.00 |
| Comparative Example E | 98.1 | | | | | | 1.00 | 0.00 | 0.00 | 0.00 | 0.00 | 0.00 |
| Example 1 | 10.4 | | | 1.4 | | | 0.65 | 0.00 | 0.00 | 0.35 | 0.00 | 0.00 |
| Example 2 | 10.6 | | | 6.5 | | | 0.29 | 0.00 | 0.00 | 0.71 | 0.00 | 0.00 |
| Example 3 | 7.6 | | | | 9.9 | | 0.42 | 0.00 | 0.00 | 0.00 | 0.58 | 0.00 |
| Example 4 | 7.6 | | | 41.8 | | | 0.15 | 0.00 | 0.00 | 0.85 | 0.00 | 0.00 |
| Example 5 | 9.2 | | 9.8 | | | 0.0 | 0.47 | 0.00 | 0.53 | 0.00 | 0.00 | 0.00 |
| Example 6 | 21.0 | | 10.1 | | | 0.0 | 0.66 | 0.00 | 0.34 | 0.00 | 0.00 | 0.00 |
| Example 7 | 22.4 | | 37.5 | | | 0.0 | 0.36 | 0.00 | 0.64 | 0.00 | 0.00 | 0.00 |
| Example 8 | 35.4 | | | 10.2 | | | 0.46 | 0.00 | 0.00 | 0.54 | 0.00 | 0.00 |
| Example 9 | 9.0 | | 8.7 | | | 0.0 | 0.49 | 0.00 | 0.51 | 0.00 | 0.00 | 0.00 |
| Example 10 | 14.7 | | 23.0 | | | 0.0 | 0.37 | 0.00 | 0.63 | 0.00 | 0.00 | 0.00 |
| Example 11 | 22.4 | | 48.1 | 85.5 | | | 0.05 | 0.00 | 0.12 | 0.82 | 0.00 | 0.00 |
| Example 12 | 23.4 | | 52.7 | 38.7 | | | 0.10 | 0.00 | 0.24 | 0.66 | 0.00 | 0.00 |
| Example 13 | 22.1 | | 7.1 | 21.4 | | | 0.19 | 0.00 | 0.07 | 0.75 | 0.00 | 0.00 |
| Example 14 | 21.5 | | 7.6 | 7.6 | | | 0.35 | 0.00 | 0.14 | 0.51 | 0.00 | 0.00 |
| Example 15 | 34.2 | | 55.9 | 39.2 | | | 0.13 | 0.00 | 0.24 | 0.63 | 0.00 | 0.00 |
| Example 16 | 51.71 | 17.17 | 4.22 | | | | 0.46 | 0.50 | 0.04 | 0.00 | 0.00 | 0.00 |
| Example 17 | 51.3 | | 34.4 | | | 50.1 | 0.37 | 0.00 | 0.27 | 0.00 | 0.00 | 0.37 |
| Example 18 | 50.4 | 19.8 | | | | 48.8 | 0.30 | 0.40 | 0.00 | 0.00 | 0.00 | 0.30 |

Table 6, below, summarizes the atomic ratios of Pt to Ta, Pt to Ti, Pt to W, Ta to Ir, Ta to Ti, Ta to Ni, and Ir to Ni, based on the compositions from Table 5, above. Comparative Example A did not contain Ni, Ta, Ti, W, or Ir, and the atomic ratios were either infinite (division by 0) or undefined (0/0, denoted by "-").

TABLE 6

| Example | Pt:Ta Atomic Ratio | Pt:Ti Atomic Ratio | Pt:W Atomic Ratio | Pt to Collective Underlayer Metal Atomic Ratio | Ta:Ir Atomic Ratio | Ta:Ti Atomic Ratio | Ta:Ni Atomic Ratio | Ir:Ni Atomic Ratio |
|---|---|---|---|---|---|---|---|---|
| Comparative Example A | Infinite | Infinite | Infinite | Infinite | — | — | — | — |
| Comparative Example B | Infinite | Infinite | Infinite | Infinite | — | — | — | — |
| Comparative Example C | Infinite | Infinite | Infinite | Infinite | — | — | — | — |
| Comparative Example D | Infinite | Infinite | Infinite | Infinite | — | — | — | — |
| Comparative Example E | Infinite | Infinite | Infinite | Infinite | — | — | — | — |
| Example 1 | Infinite | 1.82 | Infinite | 1.82 | — | — | — | — |
| Example 2 | Infinite | 0.40 | Infinite | 0.40 | — | — | — | — |
| Example 3 | Infinite | Infinite | 0.72 | 0.72 | — | — | — | — |
| Example 4 | Infinite | Infinite | 0.17 | 0.17 | — | — | — | — |
| Example 5 | 0.87 | Infinite | Infinite | 0.87 | — | — | — | — |
| Example 6 | 1.93 | Infinite | Infinite | 1.93 | — | — | — | — |
| Example 7 | 0.55 | Infinite | Infinite | 0.55 | — | — | — | — |
| Example 8 | Infinite | 0.85 | Infinite | 0.85 | — | — | — | — |
| Example 9 | 0.96 | Infinite | Infinite | 0.96 | — | — | — | — |
| Example 10 | 0.59 | Infinite | Infinite | 0.59 | — | — | — | — |
| Example 11 | 0.43 | 0.06 | Infinite | 0.06 | — | 0.15 | — | — |
| Example 12 | 0.41 | 0.15 | Infinite | 0.11 | — | 0.36 | — | — |
| Example 13 | 2.89 | 0.25 | Infinite | 0.23 | — | 0.09 | — | — |
| Example 14 | 2.62 | 0.69 | Infinite | 0.55 | — | 0.26 | — | — |
| Example 15 | 0.57 | 0.21 | Infinite | 0.16 | — | 0.38 | — | — |
| Example 16 | 11.36 | Infinite | Infinite | 0.84 | — | — | 0.08 | — |
| Example 17 | 1.38 | Infinite | Infinite | 0.58 | 0.73 | — | — | — |
| Example 18 | Infinite | Infinite | Infinite | 0.44 | — | — | — | 0.75 |

Next, the catalyst's electrochemical performance was assessed by assembling into a membrane electrode assembly (MEA), and operating the catalyst as a fuel cell cathode, as described below. Typically, at least 2 separate MEAs for each catalyst type were fabricated and assessed, and average values are reported.

Comparative Example A catalyst and NSTF PtCoMn coated anode catalyst whiskers (0.05 mg$_{Pt}$/cm², Pt$_{69}$Co$_{28}$Mn$_3$) on MCTS were then transferred to either side of a 24-micrometer thick proton exchange membrane (obtained under the trade designation "3M PFSA 825EW" (neat) from 3M Company, St. Paul, Minn.), using a laminator (obtained under the trade designation "HL-101" from ChemInstruments, Inc., West Chester Township, Ohio) to form a catalyst coated membrane (CCM). The three-layer stack-up was hand fed into the laminator with hot nip rolls at 270° F. (132° C.), 150 psi (1.03 MPa) nip, and rotating at the equivalent of 0.5 fpm (0.25 cm/s). Immediately after lamination, the MCTS layers were peeled back, leaving the catalyst coated whiskers embedded into either side of the PEM. The CCM was installed with identical gas diffusion layers (obtained under the trade designation "3M 2979 GAS DIFFUSION LAYERS" from 3M Company) on the anode and cathode in 50 cm² active area test cells (obtained under the trade designation "50 CM² CELL HARDWARE" from Fuel Cell Technologies, Inc., Albuquerque, N. Mex.) with quad-serpentine flow fields with gaskets selected to give 10% compression of the gas diffusion layers. Comparative Example A catalyst was evaluated as the fuel cell cathode.

After assembly, the test cells were connected to a test station (obtained under the trade designation "SINGLE FUEL CELL TEST STATION" from Fuel Cell Technologies, Inc.). The MEA was then operated for about 40 hours under a conditioning protocol to achieve apparent steady state performance. The protocol consisted of repeated cycles of operational and shutdown phases, each about 40 and 45 minutes in duration, respectively. In the operational phase, the MEA was operated at 75° C. cell temperature, 70° C. dewpoint, 101/101 kPaA $H_2$/Air, with constant flow rates of 800 and 1800 standard cubic centimeters per minute (sccm) of $H_2$ and air, respectively. During the 40-minute operational phase, the cell voltage was alternated between 5-minute long polarization cycles between 0.85 V and 0.25 V and 5-minute long potential holds at 0.40 V. During the 45-minute shutdown phase, the cell potential was set to open circuit voltage, $H_2$ and air flows to the cell were halted, and the cell temperature was cooled towards room temperature while liquid water was injected into the anode and cathode cell inlets at 0.26 g/min. and 0.40 g/min., respectively.

After conditioning the MEAs, the electrocatalysts were characterized for relevant beginning of life (BOL) characteristics, including catalyst activity, surface area, and operational performance under relevant $H_2$/Air test conditions, described as follows.

The cathode oxygen reduction reaction (ORR) absolute activity was measured with saturated 150 kPaA $H_2$/$O_2$, 80° C. cell temperature for 1200 seconds at 900 mV vs. the 100% $H_2$ reference/counter electrode. The ORR absolute activity (A/cm² or mA/cm²) was obtained by adding the measured current density after 1050 seconds of hold time and the electronic shorting and hydrogen crossover current densities, estimated from 2 mV/s cyclic voltammograms measured with $N_2$ fed to the working electrode instead of $O_2$. The electrocatalyst mass activity, a measure of the catalyst activity per unit precious metal content, is calculated by dividing the corrected ORR absolute activity (A/cm²$_{planar}$) by the cathode Pt areal loading (mg/cm²) to obtain the Pt mass activity (A/mg$_{Pt}$), or by dividing the corrected ORR absolute activity by the cathode total platinum group metal (PGM) areal loading to obtain the PGM mass activity (A/mg$_{PGM}$). The PGM mass activity of Comparative Example A was 0.14 A/mg$_{PGM}$, reported in Table 7, below.

TABLE 7

| Example | Mass Activity A/mg$_{PGM}$ | Specific Area m²$_{PGM}$/g$_{PGM}$ | Specific Activity mA/cm²$_{PGM}$ |
|---|---|---|---|
| Comparative Example A | 0.14 | 10.4 | 1.35 |

TABLE 7-continued

| Example | Mass Activity A/mg$_{PGM}$ | Specific Area m²$_{PGM}$/g$_{PGM}$ | Specific Activity mA/cm²$_{PGM}$ |
|---|---|---|---|
| Comparative Example B | 0.16 | 13.2 | 1.23 |
| Comparative Example C | 0.16 | 11.4 | 1.37 |
| Comparative Example D | 0.15 | 9.5 | 1.61 |
| Comparative Example E | 0.16 | 8.0 | 2.01 |
| Example 1 | 0.11 | 6.7 | 1.72 |
| Example 2 | 0.13 | 9.5 | 1.38 |
| Example 3 | 0.10 | 22.7 | 0.46 |
| Example 4 | 0.15 | 30.3 | 0.48 |
| Example 5 | 0.02 | 1.5 | — |
| Example 6 | 0.16 | 11.3 | 1.39 |
| Example 7 | 0.04 | 1.6 | 2.17 |
| Example 8 | 0.10 | 14.4 | 0.68 |
| Example 9 | 0.01 | 4.5 | — |
| Example 10 | 0.00 | 2.1 | — |
| Example 11 | 0.19 | 7.9 | 2.58 |
| Example 12 | 0.00 | 13.4 | — |
| Example 13 | 0.01 | 0.1 | — |
| Example 14 | 0.13 | 8.9 | 1.48 |
| Example 15 | 0.01 | 0.2 | — |
| Example 16 | 0.20 | 18.7 | 1.08 |
| Example 17 | 0.08 | 11.3 | 0.72 |
| Example 18 | 0.11 | 11.2 | 0.98 |

The cathode catalyst surface enhancement factor (SEF, m²$_{PGM}$/m²$_{planar}$ or analogously cm²$_{PGM}$/cm²$_{planar}$) was measured via cyclic voltammetry (100 mV/s, 0.65 V-0.85 V, average of 100 scans) under saturated 101 kilopascals absolute pressure (kPaA) $H_2$/$N_2$ and 70° C. cell temperature. The SEF was estimated by taking the average of the integrated hydrogen underpotential deposition (Hupp) charge (microC/cm²$_{planar}$) for the oxidative and reductive waves and dividing by 220 microC/cm²$_{Pt}$. The electrocatalyst's specific surface area (m²$_{PGM}$/g$_{PGM}$), a measure of catalyst dispersion, was calculated by dividing the SEF (m²$_{PGM}$/m²$_{planar}$) by the areal PGM loading (g$_{PGM}$/m²$_{planar}$). The specific area of Comparative Example A was 10.4 m²$_{PGM}$/g$_{PGM}$, reported in Table 7, above.

The cathode catalyst oxygen reduction specific activity was calculated by dividing the corrected ORR absolute activity (A/cm²$_{planar}$) by the SEF (cm²$_{PGM}$/cm²$_{planar}$) to obtain the specific activity expressed in (A/cm²$_{PGM}$), or after unit conversion as mA/cm²$_{PGM}$ (multiply (A/cm²) by 1000 mA per A). Specific activity values were not calculated for catalysts with mass activities of 0.02 A/mg or less. The specific activity of Comparative Example A was 1.35 mA/cm²$_{PGM}$, summarized in Table 7, above.

Comparative Examples B-E

Comparative Examples B-E were prepared and characterized as described for Comparative Example A, except that the Pt deposition process modified such that the Pt areal loadings were 23.8, 27.0, 54.2, and 98.1 micrograms/cm². The results are provided in Table 6, above.

Example 1

Example 1 catalyst was prepared and characterized as described for Comparative Example A, except that a layer of titanium was deposited prior to the deposition of Pt, the Pt deposition conditions were modified to change the Pt loading, and the catalyst was thermally annealed prior to assembling into a membrane electrode assembly.

NSTF catalyst layers were prepared by sputter coating catalyst films sequentially using a DC-magnetron physical vapor deposition (PVD) sputtering process onto the layer of microstructured whiskers, Preparatory Example A. A vacuum sputter deposition system was used with typical sputter gas pressures of about 3.3 mTorr (0.44 Pa), and 5-inch×15-inch (12.7 cm×38.1 cm) rectangular Pt and Ti sputter targets. The system base pressure was typically $2.5 \times 10^{-5}$ Torr (0.0033 Pa), and the typically determined background gas was water vapor. The coatings were deposited by using ultra high purity Ar as the sputtering gas.

A single Ti layer with planar equivalent thickness of about 0.51 nm was first deposited onto the whiskers on MCTS from a pure Ti target. The Ti deposition process was conducted 10 times, resulting in an areal Ti loading of about 2.3 micrograms/cm$^2$, a Ti planar equivalent thickness of 5.1 nm, and a Ti thickness on the microstructured whisker of about 0.36 nm. Next, a single Pt layer was deposited with a planar equivalent thickness of 0.94 nm. The Pt deposition process was conducted 5 times, resulting in an areal Pt loading of about 10 microgram/cm$^2$, a Pt planar equivalent thickness of 4.7 nm, and a Pt thickness on the microstructured whisker of about 0.33 nm.

After deposition, the electrocatalyst on MCTS was placed into a quartz tube furnace (obtained under the trade designation "LINDBERG BLUE M" from Thermo Electron Corporation, Waltham, Mass.) and heated to 340° C. under flowing H$_2$. After about a 20-minute temperature ramp, the catalyst was annealed for about 0.5 hour at temperature, and then allowed to cool to room temperature over about a 3-hour period. After cooling to room temperature, the tube furnace was purged with nitrogen for about 15 minutes to remove any remaining H$_2$, after which the catalyst on the substrate was removed from the furnace. After annealing, the catalyst was assembled into a membrane electrode assembly and characterized as described for Comparative Example A. The results are provided in Table 7, above.

Example 2

Example 2 was prepared and characterized as described for Example 1, except that the Ti deposition process modified such that the Ti areal loading was about 9 micrograms/cm$^2$. The results are provided in Table 7, above.

Example 3

Example 3 was prepared and characterized as described for Example 1, except that W was deposited in place of Ti.

NSTF catalyst layers were prepared by sputter coating catalyst films sequentially using two individual DC-magnetron physical vapor deposition (PVD) sputtering processes onto the layer of microstructured whiskers, Preparatory Example A. A first vacuum sputter deposition system was used with typical sputter gas pressures of about 2.5 mTorr (0.33 Pa), and a 3.85-inch×21-inch rectangular W sputter target. The system base pressure was typically $8 \times 10^{-6}$ Torr (0.001 Pa), and the typically determined background gas was water vapor. The coatings were deposited by using ultra high purity Ar as the sputtering gas. A W layer with planar equivalent thickness of about 5.2 nm was first deposited onto the whiskers on MCTS from a pure W target, resulting in an areal W loading of about 10 micrograms/cm$^2$ and a W thickness on the microstructured whisker of about 0.37 nm.

After W deposition, the W-coated NSTF substrate was removed from the first coater and placed in a second PVD coater. The second PVD coater was used with typical sputter gas pressures of about 3.3 mTorr (0.44 Pa), and a 5-inch×15-inch (12.7 cm×38.1 cm) rectangular Pt sputter target. The system base pressure was typically $2.5 \times 10^{-5}$ Torr (0.0033 Pa), and the typically determined background gas was water vapor. The coatings were deposited by using ultra high purity Ar as the sputtering gas. Next, a single Pt layer was deposited with a planar equivalent thickness of 0.47 nm. The Pt deposition process was conducted 10 times, resulting in an areal Pt loading of about 10 microgram/cm$^2$, a Pt planar equivalent thickness of 4.7 nm, and a Pt thickness on the microstructured whisker of about 0.33 nm.

After deposition, the catalyst was annealed and assembled into a membrane electrode assembly and characterized as described for Example 1. The results are provided in Table 7, above.

Example 4

Example 4 was prepared and characterized as described for Example 3, except that the W deposition process modified such that the W areal loading was about 39 micrograms/cm$^2$. The results are provided in Table 7, above.

Example 5

Example 5 was prepared and characterized as described for Example 1, except that Ta was deposited in place of Ti, and the Ta deposition process was modified such that O$_2$ was also used with the Ar.

NSTF catalyst layers were prepared by sputter coating catalyst films sequentially using a DC-magnetron physical vapor deposition (PVD) sputtering process onto the layer of microstructured whiskers, Preparatory Example A. A vacuum sputter deposition system was used with typical sputter gas pressures of about 3.3 mTorr (0.44 Pa), and 5-inch×15-inch (12.7 cm×38.1 cm) rectangular Pt and Ta sputter targets. The system base pressure was typically $2.5 \times 10^{-5}$ Torr (0.0033 Pa), and the typically determined background gas was water vapor. The coatings were deposited by using ultra high purity Ar and O$_2$ as the sputtering gases, with an Ar to O$_2$ atomic ratio of 5:1.

A single Ta layer with planar equivalent thickness of about 0.1 nm was first deposited onto the whiskers on MCTS from a pure Ta target. The Ta deposition process was conducted 50 times, resulting in an areal Ta loading of about 8 micrograms/cm$^2$, a Ta planar equivalent thickness of 4.9 nm, and a Ta thickness on the microstructured whisker of about 0.35 nm. Next, a single Pt layer was deposited with a planar equivalent thickness of 0.47 nm. The Pt deposition process was conducted 10 times, resulting in an areal Pt loading of about 10 microgram/cm$^2$, a Pt planar equivalent thickness of 4.7 nm, and a Pt thickness on the microstructured whisker of about 0.33 nm.

After deposition, the catalyst was annealed and assembled into a membrane electrode assembly characterized as described for Example 1. The results are provided in Table 7, above.

Example 6

Example 6 was prepared and characterized as described for Example 5, except that the Pt deposition process modified such that the Pt areal loading was about 20 micrograms/cm$^2$. The results are provided in Table 7, above.

Example 7

Example 7 was prepared and characterized as described for Example 6, except that the Ta deposition process was modified such that $N_2$ was used in place of $O_2$ and the catalyst was not annealed.

NSTF catalyst layers were prepared by sputter coating catalyst films sequentially using a physical vapor deposition (PVD) process of RF magnetron sputtering to deposit Ta and DC magnetron sputtering to deposit Pt onto the layer of microstructured whiskers, Preparatory Example A. A vacuum sputter deposition system (provided by Kurt J. Lesker Company in Jefferson Hills, Pa., USA under trade designation "PRO Line PVD 75") was used with typical sputter gas pressures of about 3.0 mTorr (0.40 Pa), and 3-inch diameter circular Pt and Ta sputter targets. The system base pressure was typically $1.0 \times 10^{-5}$ Torr (0.0027 Pa). The Ta coatings were deposited by using ultra high purity Ar and $N_2$ as the sputtering gases, with an Ar to $N_2$ atomic ratio of 7.4:1. The Pt coatings were deposited by using ultra high purity Ar.

A Ta layer was first continuously deposited onto the whiskers on MCTS, which was affixed to a platen rotating at 20 rotations per minute from a pure Ta target. The Ta deposition process was conducted for a total of 1000 seconds, resulting in an areal Ta loading of about 8 micrograms/$cm^2$, a Ta planar equivalent thickness of 4.9 nm, and a Ta thickness on the microstructured whisker of about 0.35 nm. Next, a Pt layer was deposited continuously onto the coated whiskers on MCTS which were affixed to the aforementioned platen rotating at 20 rotations per minute. The Pt deposition process was conducted over the duration of 40 seconds, resulting in an areal Pt loading of about 20 microgram/$cm^2$, a Pt planar equivalent thickness of 9.3 nm, and a Pt thickness on the microstructured whisker of about 0.67 nm.

After deposition, the catalyst was assembled into a membrane electrode assembly and characterized as described for Example 6. The results are provided in Table 7, above.

Illustrative Example I

Illustrative Example I was prepared similarly to Example 7, except that the Ta layer was deposited onto a silicon wafer (obtained under the trade designation "Si wafer, SSP (single side polished), diameter 150 mm, undoped, item ID 478", from University Wafer, South Boston, Mass.) instead of Preparatory Example A, no surface Pt was deposited, and the Ta layer was not annealed. Illustrative Example I was characterized by X-Ray Photoelectron Spectroscopy (XPS) to determine relative elemental concentrations of C, N, O, Ti, and Ta near the Ta layer surface. Table 8, below, summarizes the relative atomic % of C, N, O, Ti, and Ta. Illustrative Example I contained 19.3 at. % C, 24.5 at. % N, 28.8 at. % O, and 27.4 at. % Ta. The Ta to N atomic ratio was about 1.1 (determined by dividing 27.4 at. % Ta by 24.5 at. % N).

TABLE 8

| Example | C, at. % | N, at. % | O, at. % | Ti, at. % | Ta., at. % |
|---|---|---|---|---|---|
| Illustrative Example I | 19.3 | 24.5 | 28.8 | — | 27.4 |
| Illustrative Example II | 26.6 ± 0.6 | 21.9 ± 0.6 | 28.6 ± 1.4 | — | 23.0 ± 0.4 |
| Illustrative Example III | 28.9 ± 1.8 | 16.0 ± 0.6 | 34.1 ± 1.0 | 21.0 ± 0.8 | — |

Illustrative Example II

Figure 3:
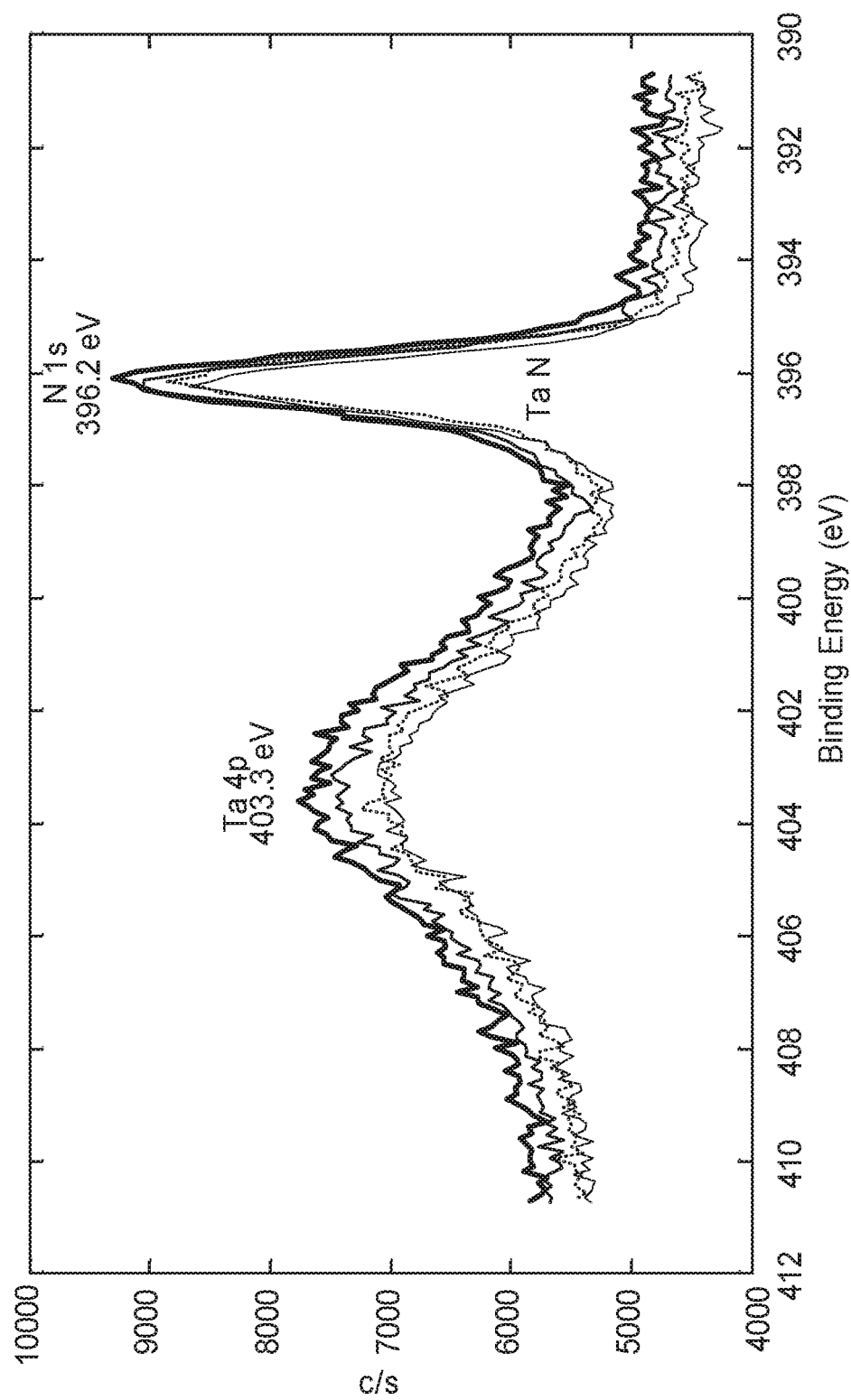
FIG. 3 is a plot of X-Ray Photoelectron Spectroscopy spectra of the surface of Illustrative Example II.

Illustrative Example II was prepared similarly to Illustrative Example I, except that the Ta layer was deposited with an argon to nitrogen ratio of 10.1:1. After deposition, Illustrative Example II was characterized by XPS, listed in Table 8, above. The Ta to N atomic ratio was about 1.05. XPS spectra from 4 different regions of Illustrative Example II are plotted in FIG. 3, where the N is peak at 396.2 eV and the Ta to N ratio of 1.05 were consistent with presence of TaN on the surface. Additionally, the composition of Illustrative Example II was assessed as a function of thickness by $Ar^+$ sputtering depth profile XPS, summarized in FIG. 4. At the surface, the composition was as noted in Table 8, above. As the surface of Illustrative Example II was sputtered away by $Ar^+$ ions, the composition changed during approximately the first minute of sputter time and then was approximately stable for the remaining 36 minutes. The approximately stable composition over the final 36 minutes was approximately 58-60 at. % Ta, 38-42 at. % N, 0-5 at. % O, and <2 at. % C. The decrease of O content from 28.6 at. % to 0-5 at. % and the decrease in C content from 26.6 to <2 at. % during the first minute of sputter time indicates that the O and C were predominantly at the surface of the TaN film and minimally present in the bulk of the film.

Example 8

Example 8 was prepared and characterized as described for Example 7, except that Ti was deposited in place of Ta, the Ti deposition process was modified such that the Ti areal loading was about 5 micrograms/$cm^2$, and the catalyst was annealed after deposition.

NSTF catalyst layers were prepared by sputter coating catalyst films sequentially using a physical vapor deposition (PVD) process of RF magnetron sputtering to deposit Ta and DC magnetron sputtering to deposit Pt onto the layer of microstructured whiskers, Preparatory Example A.

A vacuum sputter deposition system (obtained under trade designation "PRO Line PVD 75" from Kurt J. Lesker Company, Jefferson Hills, Pa., USA) was used with typical sputter gas pressures of about 3.0 mTorr (0.40 Pa), and 3-inch diameter circular Pt and Ti sputter targets. The system base pressure was typically $1.0 \times 10^{-5}$ Torr (0.0027 Pa). The Ti coating was deposited by using ultra high purity Ar and $N_2$ as the sputtering gases, with an Ar to $N_2$ atomic ratio of 10:1. The Pt coating was deposited using ultra high purity Ar.

A Ti layer was first deposited continuously onto the whiskers on MCTS affixed to a platen rotating at 20 rotations per minute from a pure Ti target. The Ti deposition process was conducted for a total of 2000 seconds, resulting in a targeted areal Ti loading of about 5 micrograms/$cm^2$, a Ti planar equivalent thickness of 11.1 nm, and a Ti thickness on the microstructured whisker of about 0.79 nm. Next, a Pt layer with was deposited continuously onto the coated whiskers on MCTS which were affixed to the aforementioned platen rotating at 20 rotations per minute. The Pt deposition process was conducted over a duration of 40 seconds, resulting in a targeted areal Pt loading of about 20 microgram/cm², a Pt planar equivalent thickness of 9.3 nm, and a Pt thickness on the microstructured whisker of about 0.67 nm.

After deposition, the catalyst was assembled into a membrane electrode assembly and characterized as described for Example 7. The results are provided in Table 7, above.

Illustrative Example III

Illustrative Example III was prepared similarly to Example 8, except that the Ti layer was deposited onto a silicon wafer, no surface Pt was deposited, and the Ti layer was not annealed. Illustrative Example III was characterized by XPS, summarized in Table 7, above. The Ti to N atomic ratio was about 1.31.

Example 9

Example 9 was prepared and characterized as described for Example 5, except that Ta and Pt were deposited with Metal-Organic Chemical Vapor Deposition (MOCVD) and the Ta and Pt areal loadings were about 8 and 5 micrograms/cm², respectively.

Preparatory Example A was placed in a tubular furnace with controlled atmosphere. This tubular furnace holds a 6-inch (15.2 cm) diameter quartz tube connected to a scroll pump equipped with a chemical filter. Ar and $H_2$ were used as carrier and reactive gases, respectively. 0.51 gram of tantalum (V) ethoxide ($Ta(OC_2H_5)_5$) and 0.15 gram of dimethyl(1,5-cyclooctadiene) platinum (II) ($C_{10}H_{18}Pt$) were placed in the quartz tube but outside the tubular furnace. The pressure inside the quartz tube was reduced to mTorr range. The temperature of the furnace was increased from room temperature to 250° C. A mixture of hydrogen (10 sccm) and argon (100 sccm) was introduced into the vacuum quartz tube. A pressure of 30 Torr was maintained using a pressure control butterfly valve. The Ta source was first sublimated around 110-120° C. using a separate heater wrapped around the quartz tube. The Pt source was then sublimated around 90-95° C. using a separate heater wrapped around the quartz tube.

After deposition, the catalyst was assembled into a membrane electrode assembly and characterized as described for Example 5. The results are provided in Table 7, above.

Example 10

Example 10 was prepared and characterized as described for Example 9, except that the Pt and Ta precursor loadings were increased to 0.21 gram and 0.62 gram, respectively, resulting in higher Pt and Ta loadings. The results are provided in Table 7, above.

Example 11

Example 11 was prepared and characterized as described for Example 1, except that the Ti deposition process was modified such that Ta was also deposited, forming a Ta-doped Ti layer.

NSTF catalyst layers were prepared by sputter coating catalyst films sequentially using a DC-magnetron physical vapor deposition (PVD) sputtering process onto the layer of microstructured whiskers, Preparatory Example A. A vacuum sputter deposition system was used with typical sputter gas pressures of about 3.3 mTorr (0.44 Pa), and 5-inch×15-inch (12.7 cm×31.7 cm) rectangular Pt, Ti, and Ta sputter targets. The system base pressure was typically 2.5×10⁻⁵ Torr (0.0033 Pa), and the typically determined background gas was water vapor. The coatings were deposited by using ultra high purity Ar as the sputtering gas.

A single Ta layer with planar equivalent thickness of about 0.15 nm was first deposited onto the whiskers on MCTS from a pure Ta target. Next, a single Ti layer with planar equivalent thickness of about 1.33 nm was deposited onto the Ta layer from a pure Ti target. The Ta and Ti deposition process was conducted 200 times, resulting in areal Ta and Ti loadings of about 50 and 120 micrograms/cm², respectively, Ta and Ti planar equivalent thicknesses of 30.5 and 266.3 nm, respectively, and a Ta and Ti thicknesses on the microstructured whisker of about 2.18 and 19.02 nm. The collective planar equivalent thickness of the Ta and Ti layers (the sum of the planar equivalent thicknesses of all Ta and Ti layers deposited) was about 296.8 nm, and the collective thickness on microstructured whiskers of the Ta and Ti layers was about 21.2 nm. Next, a single Pt layer was deposited with a planar equivalent thickness of 0.47 nm. The Pt deposition process was conducted 20 times, resulting in an areal Pt loading of about 20 microgram/cm², a Pt planar equivalent thickness of 9.3 nm, and a Pt thickness on the microstructured whisker of about 0.67 nm.

After deposition, the catalyst was assembled into a membrane electrode assembly and characterized as described for Example 1. The results are provided in Table 7, above.

Examples 12 and 13

Examples 12 and 13 were prepared and characterized as described for Example 11, except that the Ti deposition process was modified such that the Ti areal loadings were about 53 and 30 micrograms/cm², respectively, yielding collective planar thicknesses of the Ta and Ti layers of 148.1 and 97.1 nm, respectively, and collective thicknesses on the microstructured whiskers of 10.6 and 6.9 nm, respectively.

The results are provided in Table 7, above.

Examples 14 and 15

Examples 14 and 15 were prepared and characterized as described for Example 11, except that the Ti and Ta deposition processes were modified such that the Ti areal loadings were about 10 and 20 micrograms/cm², respectively, and the Ta areal loadings were about 13 and 33.5 micrograms/cm², respectively. The collective planar equivalent thicknesses of the Ta and Ti layers of Examples 14 and 15 were 27.9 and 56 nm, respectively, and the collective thicknesses on microstructured whiskers of 1.99 and 4.00 nm, respectively. The results are provided in Table 7, above.

Example 16

Example 16 was prepared and characterized as described for Example 11, except that the deposition process was modified such that Ni was deposited in place of Ti and the Pt deposition process was modified such that the Pt areal loading was about 47 micrograms/cm².

NSTF catalyst layers were prepared by sputter coating catalyst films sequentially using a DC-magnetron physical vapor deposition (PVD) sputtering process onto the layer of microstructured whiskers, Preparatory Example A. A vacuum sputter deposition system was used with typical sputter gas pressures of about 3.3 mTorr (0.44 Pa), and 5-inch×15-inch (12.7 cm×31.7 cm) rectangular Pt, Ni, and Ta sputter targets. The system base pressure was typically 2.5×10$^{-5}$ Torr (0.0033 Pa), and the typically determined background gas was water vapor. The coatings were deposited by using ultra high purity Ar as the sputtering gas.

A single Ta layer with planar equivalent thickness of about 0.66 nm was first deposited onto the whiskers on MCTS from a pure Ta target. Next, a single Ni layer with planar equivalent thickness of about 1.63 nm was deposited onto the Ta layer from a pure Ni target. The Ta and Ni deposition process was conducted 12 times, resulting in areal Ta and Ni loadings of about 13 and 17.5 micrograms/cm$^2$, respectively, Ta and Ni planar equivalent thicknesses of 7.9 and 19.6 nm, respectively, and Ta and Ni thicknesses on the microstructured whisker of about 0.57 and 1.4 nm. The collective planar equivalent thickness of the Ta and Ni layers was about 27.5 nm, and the collective thickness on microstructured whiskers of the Ta and Ni layers was about 1.96 nm.

Next, a single Pt layer was deposited with a planar equivalent thickness of 0.47 nm. The Pt deposition process was conducted 47 times, resulting in an areal Pt loading of about 47 microgram/cm$^2$, a Pt planar equivalent thickness of 21.9 nm, and a Pt thickness on the microstructured whisker of about 1.56 nm.

After deposition, the catalyst was annealed and assembled into a membrane electrode assembly and characterized as described for Example 11. The results are provided in Table 7, above.

Example 17

Example 17 was prepared and characterized as described for Example 16, except that the deposition process was modified such that Ir was deposited in place of Ni.

NSTF catalyst layers were prepared by sputter coating catalyst films sequentially using a DC-magnetron physical vapor deposition (PVD) sputtering process onto the layer of microstructured whiskers, Preparatory Example A. A vacuum sputter deposition system was used with typical sputter gas pressures of about 3.3 mTorr (0.44 Pa), and 5-inch×15-inch (12.7 cm×31.7 cm) rectangular Pt, Ir, and Ta sputter targets. The system base pressure was typically 2.5×10$^{-5}$ Torr (0.0033 Pa), and the typically determined background gas was water vapor. The coatings were deposited by using ultra high purity Ar as the sputtering gas.

A single Ta layer with planar equivalent thickness of about 1.02 nm was first deposited onto the whiskers on MCTS from a pure Ta target. Next, a single Ir layer with planar equivalent thickness of about 1.11 nm was deposited onto the Ta layer from a pure Ir target. The Ta and Ir deposition process was conducted 20 times, resulting in areal Ta and Ir loadings of about 33.5 and 50 micrograms/cm$^2$, respectively, Ta and Ir planar equivalent thicknesses of 20.4 and 22.2 nm, respectively, and Ta and Ir thicknesses on the microstructured whisker of about 1.46 and 1.58 nm. The collective planar equivalent thickness of the Ta and Ir layers was about 42.6 nm, and the collective thickness on microstructured whiskers of the Ta and Ir layers was about 3.04 nm. Next, a single Pt layer was deposited with a planar equivalent thickness of 0.47 nm. The Pt deposition process was conducted 47 times, resulting in an areal Pt loading of about 47 microgram/cm$^2$, a Pt planar equivalent thickness of 21.9 nm, and a Pt thickness on the microstructured whisker of about 1.56 nm.

After deposition, the catalyst was annealed and assembled into a membrane electrode assembly and characterized as described for Example 16. The results are provided in Table 7, above.

Example 18

Example 18 was prepared and characterized as described for Example 16, except that the deposition process was modified such that Ni was deposited in place of Ta.

NSTF catalyst layers were prepared by sputter coating catalyst films sequentially using a DC-magnetron physical vapor deposition (PVD) sputtering process onto the layer of microstructured whiskers, Preparatory Example A. A vacuum sputter deposition system was used with typical sputter gas pressures of about 3.3 mTorr (0.44 Pa), and 5-inch×15-inch (12.7 cm×31.7 cm) rectangular Pt, Ir, and Ni sputter targets. The system base pressure was typically 2.5×10$^{-5}$ Torr (0.0033 Pa), and the typically determined background gas was water vapor. The coatings were deposited by using ultra high purity Ar as the sputtering gas.

A single Ni layer with planar equivalent thickness of about 1.53 nm was first deposited onto the whiskers on MCTS from a pure Ni target. Next, a single Ir layer with planar equivalent thickness of about 1.48 nm was deposited onto the Ni layer from a pure Ir target. The Ni and Ir deposition process was conducted 15 times, resulting in areal Ni and Ir loadings of about 20.5 and 50 micrograms/cm$^2$, respectively, Ni and Ir planar equivalent thicknesses of 23.0 and 22.2 nm, respectively, and Ni and Ir thicknesses on the microstructured whisker of about 1.64 and 1.58 nm. The collective planar equivalent thickness of the Ni and Ir layers was about 45.2 nm, and the collective thickness on microstructured whiskers of the Ni and Ir layers was about 3.22 nm. Next, a single Pt layer was deposited with a planar equivalent thickness of 0.47 nm. The Pt deposition process was conducted 47 times, resulting in an areal Pt loading of about 47 microgram/cm$^2$, a Pt planar equivalent thickness of 21.9 nm, and a Pt thickness on the microstructured whisker of about 1.56 nm.

After deposition, the catalyst was annealed and assembled into a membrane electrode assembly and characterized as described for Example 17. The results are provided in Table 7, above.

Table 7, above, summarizes the results from Examples 1 and 2, which comprised Ti as a layer beneath the surface Pt layer (i.e., a Ti "underlayer"), and Examples 3 and 4, which comprised W as a layer beneath the surface Pt layer (i.e., a W "underlayer"). Examples 1-4 had target Pt areal loadings of 10 micrograms per cm$^2$. Example 1 had a Pt to Ti atomic ratio of 1.07, similar to the Example 3 Pt to W atomic ratio of 0.94. Examples 2 and 4 had Pt to underlayer metal atomic ratios of 0.27, lower than Examples 1 and 3. The mass activities of Examples 1-4 Pt catalysts with Ti or W underlayers depended upon the atomic ratio of Pt to the underlayer metal. The mass activities of Examples 2 and 4 were 0.13 and 0.15 A/mg$_{PGM}$, respectively, higher than the mass activities of Examples 1 and 3, 0.11 and 0.10 A/mg$_{PGM}$, respectively. The specific areas of Examples 1-4 Pt catalysts with Ti or W underlayers depended upon the atomic ratio of Pt to the underlayer metal and underlayer metal type. The specific areas of Examples 3 and 4 catalysts, Pt catalysts with W underlayers, were 22.7 and 30.3 m$^2_{PGM}$/g$_{PGM}$, respectively, higher than the specific areas of Examples 1 and 2, 6.7 and 9.5 m$^2$/g$_{PGM}$, respectively, Pt catalysts with Ti underlayers. The specific activities of the Examples 1-4 Pt catalysts depended upon underlayer metal type. The specific activities of the Examples 1 and 2 catalysts with Ti underlayers, 1.72 and 1.38 mA/cm$^2_{PGM}$, were higher than the specific activities of the Examples 3 and 4 Pt catalysts with W underlayers, 0.46 and 0.48 mA/cm$^2_{PGM}$, respectively.

Application having U.S. Ser. No. 62/657,189, filed Apr. 13, 2018, the disclosure of which is incorporated herein by reference, describes Pt catalysts with Ta underlayers which are referred to as Illustrative Examples below. Composition information for the Illustrative Examples are listed in Tables 1-3 of U.S. Ser. No. 62/657,189, filed Apr. 13, 2018, and results from the Illustrative Examples are listed in Table 5 of the same copending application. Illustrative Example 8 catalyst, which is Example 8 in application having U.S. Ser. No. 62/657,189, filed Apr. 13, 2018, had similar Pt to underlayer metal atomic ratio and similar Pt areal loadings as Examples 2 and 4. The mass activity of Illustrative Example 8, with Ta underlayer, was 0.00 A/mg, lower than Examples 2 and 4, 0.13 and 0.15 $A/mg_{PGM}$, respectively. The mass activity may depend upon selection of underlayer metal type at a Pt to underlayer metal atomic ratio near the range of 0.24 to 0.27 (i.e., when the relative Pt content is relatively low). As discussed in application having U.S. Ser. No. 62/657,189, filed Apr. 13, 2018, Ta underlayers may be partially oxidized, and oxidized Ta may have relatively lower electronic conductivity than unoxidized Ta. Similarly, Ti and W underlayers may be partially oxidized and may have reduced electronic conductivities than the unoxidized underlayers. When the Pt to underlayer metal atomic ratio is relatively low, underlayers with insufficient electronic conductivity may negatively impact Pt catalyst utilization and mass activity. Without being bound by theory, the dependence of mass activity on underlayer metal at relatively low Pt to underlayer metal atomic ratios may depend upon the oxygen content within the underlayer. Surprisingly, the Ti and W underlayers yielded higher mass activities than Ta underlayers at relatively low Pt to underlayer metal atomic ratios in a range between 0.24-0.27. Without being bound by theory, the oxygen content of the underlayer, and therefore its conductivity, may depend on the oxophilicity of the underlayer metal, an inherent property, but may also depend upon chemical interactions due to the underlayer metal being in contact with a microstructured whisker and Pt, which may not be readily predictable.

Illustrative Example 2, referring to Example 2 from application having U.S. Ser. No. 62/657,189, filed Apr. 13, 2018, was a Pt catalyst with a Ta underlayer, a Pt areal loading of 10 micrograms per $cm^2$, a Pt thickness on microstructured whisker of 0.33 nm, and a Pt to Ta atomic ratio of 1.16, similar to the respective values of Examples 1 and 3, Pt catalysts with Ti and W underlayers, respectively. The mass activity of Illustrative Example 2 was 0.09 $A/mg_{PGM}$, similar to the mass activities of Examples 1 and 3, 0.11 and 0.10 $A/mg_{PGM}$, respectively. With Pt to underlayer metal atomic ratios near the range of 0.94-1.16, the mass activity of Pt catalysts with underlayers may depend less on underlayer metal type than at relatively lower atomic ratios in a range near 0.24-0.27, discussed above. Furthermore, Illustrative Examples 2-7, referring to Examples 2-7 from application having U.S. Ser. No. 62/657,189, filed Apr. 13, 2018, were Pt catalysts with Ta underlayers with a range of Pt to Ta atomic ratios (1.16-9.75), near and above the range of Examples 1 and 3. The mass activities of Illustrative Examples 2-7 depended upon Pt to underlayer metal atomic ratio. As the Pt to Ta atomic ratio increased from 1.16 to 4.64 in Illustrative Examples 2-5, the mass activity increased from 0.09 to 0.27 $A/mg_{PGM}$. As discussed in application having U.S. Ser. No. 62/657,189, filed Apr. 13, 2018 the same date as the instant application, the increased mass activity as the Pt to underlayer metal atomic ratio increased from 1.16 to 4.64 may be due to increased Pt thickness, which causes increased Pt utilization due to improved electronic conductivity within the surface Pt thin film. Without being bound by theory, the mass activity of Pt catalysts with underlayers comprising at least one of Ti, W, Hf, Zr, or Nb may increase as the Pt to underlayer metal atomic ratio increases, similar to that observed with a Ta underlayer, due to increased Pt thickness and increased Pt utilization. Without being bound by theory, the specific Pt to underlayer metal atomic ratio where optimum mass activity occurs may depend upon the conductivity of the underlayer, which may depend upon the underlayer composition.

Table 7, above, summarizes the results from Examples 5 and 6, Pt catalysts with oxidized Ta underlayers prepared by sputter depositing the Ta in the presence of oxygen. The mass activities of Examples 5 and 6 were 0.02 $A/mg_{PGM}$ and 0.16 $A/mg_{PGM}$ and the Pt to Ta atomic ratios were 0.94 and 2.08, respectively. The mass activity of Pt catalysts with oxidized underlayers may depend upon the Pt thickness and Pt to underlayer metal atomic ratio due to differences in the conductivity of the surface Pt layer, which may influence Pt utilization.

Example 6 was a Pt catalyst with an oxygen-containing Ta underlayer prepared by sputter depositing the Ta in the presence of oxygen, Example 7 was a Pt catalyst with a nitrogen-containing Ta underlayer prepared by sputter depositing the Ta in the presence of nitrogen, and Example 8 was a Pt catalyst with a nitrogen-containing Ti underlayer prepared by sputter depositing the Ti in the presence of nitrogen. Examples 6, 7, and 8 catalysts contain similar Pt areal loadings and similar Pt to underlayer metal atomic ratios. The mass activities, specific areas, and specific activities of Examples 6, 7, and 8, reported in Table 7, above, were 0.16, 0.04, and 0.10 $A/mg_{PGM}$, respectively, 11.3, 1.6, and 14.4 $m^2/g_{PGM}$, respectively, and 1.39, 2.17, and 0.68 $mA/cm^2_{PGM}$, respectively. The mass activity, specific area, and specific activities may depend upon on selection of underlayer metal, oxygen content, and nitrogen content. Without being bound by theory, nitrides and carbides of metals selected from at least one of Ta, Ti, W, Hf, Zr, or Nb may have improved mass activity, specific area, or specific activities as compared to catalysts which do not contain such underlayers, due to increased Pt utilization. Nitride and carbide underlayer catalysts may provide improved results relative to monometallic oxide underlayer catalysts at relatively low Pt to underlayer metal atomic ratio, due to increased electronic conductivity of the nitride or carbide underlayers as compared to a monometallic oxide underlayer. Metal oxide underlayer catalysts may provide improved durability relative to metal nitride and metal carbide underlayers, due to surface passivation. Underlayers may consist of at least one of oxide, nitride, and carbide phases.

Table 7, above, summarizes the results for Examples 9 and 10, Pt catalysts with Ta underlayers prepared by MOCVD. The mass activities and specific areas Examples 9 and 10 were 0.01 and 0.00 $A/mg_{PGM}$ and 4.5 and 2.1 $m^2/g_{PGM}$.

Examples 11, 12 and 13 were Pt catalysts with underlayers comprising Ta-doped Ti, with Ta to Ti atomic ratios of 0.11, 0.25, and 0.44, respectively. Examples 11, 12, and 13 contained Pt areal loadings of 20 micrograms per $cm^2$. The mass activities of Examples 11, 12, and 13, from Table 7, above, were 0.19, 0.00, and 0.01 $A/mg_{PGM}$, respectively. Illustrative Example 9 (Example 9 from application having U.S. Ser. No. 62/657,189, filed Apr. 13, 2018) also contained a Pt areal loading of 20 micrograms per $cm^2$ but comprised an underlayer with a single metal (Ta). The mass activity of Illustrative Example 9 was 0.03 $A/mg_{PGM}$. The mass activity of Example 11 was higher than the mass activities of Examples 12 and 13 and Illustrative Example 9. Ta-doped Ti layers can be in the form of an electronic conductive oxides, and the formation of electronic conductive oxides may depend upon having an optimum Ta to Ti atomic ratio. Note that Examples 11-13 and Illustrative Example 9 were prepared by sputtering in an Ar atmosphere which also contained water vapor as a background gas, and water vapor is a source of oxygen which can be incorporated into the underlayer. Without being bound by theory, Pt catalysts with underlayers in the form of electronic conductive oxides may have improved mass activity due to increased Pt utilization at relatively low Pt to collective underlayer metal atomic ratio, due to increased electronic conductivity as compared to a single metal oxide.

Examples 12, 14, and 15 were Pt catalysts with underlayers comprising Ta-doped Ti, with fixed Ta to Ti atomic ratios of about 0.25 and varying Pt areal loadings and varying Pt to collective underlayer metal atomic ratios. Examples 14 and 15 were also sputtered in Ar with a water vapor background, and as such may also be in the form of electronic conductive oxides. The mass activities of Examples 12, 14, and 15 were 0.00, 0.13, and 0.01 A/$mg_{PGM}$, respectively, and the Pt to collective underlayer metal atomic ratios were 0.07, 0.39, and 0.20, respectively. The mass activity of Example 14, with a Pt to collective metal atomic ratio of 0.39, was higher than the mass activities of Examples 12 and 15, with Pt to collective metal atomic ratios of 0.07 and 0.20, respectively. Without being bound by theory, mass activity may depend upon Pt to collective metal atomic ratio within an electronic conductive oxide underlayer.

Example 16 is a Pt catalyst with an underlayer comprising Ta and Ni, with a Pt to collective underlayer metal atomic ratio of about 0.65 and an areal Pt loading of about 47 micrograms per $cm^2$. The mass activity and specific area of Example 16, obtained from Table 7, above, were 0.20 A/$mg_{PGM}$ and 18.7 $m^2$/$g_{PGM}$, respectively. Example 17 is a Pt catalyst with an underlayer comprising Ta and Ir, with a Pt to collective underlayer metal atomic ratio of about 0.54. The mass activity and specific area of Example 17 were 0.08 A/$mg_{PGM}$ and 11.3 $m^2$/$g_{PGM}$. The mass activities and specific areas of Examples 16 and 17 were higher than the mass activity and specific area of Illustrative Example 1, (Example 1 from application having U.S. Ser. No. 62/657,189, filed Apr. 13, 2018), which comprised a Ta underlayer without Ni or Ir and a Pt to collective underlayer metal atomic ratio of about 0.58. The mass activity and specific area of Illustrative Example 1 was 0.01 A/$mg_{PGM}$ and 0.3 $m^2$/$g_{PGM}$. Without being bound by theory, Ni and Ir are relatively less oxophilic than Ta, and Ir and Ni are more likely than Ta to remain in metallic form with higher electronic conductivity. Underlayers comprising at least one of Ta, Ti, W, Hf, Zr, or Nb, and at least one of Ni, Co, Fe, Mn, Ir, or Pt may yield improved electronic conductivity, Pt utilization, mass activity, and specific area as compared to a Ta underlayer.

Example 18 is a Pt catalyst with an underlayer comprising Ir and Ni, with a Pt to collective underlayer metal atomic ratio of about 0.40. The mass activity and specific area of Example 18 were 0.11 A/$mg_{PGM}$ and 11.2 $m^2$/$g_{PGM}$. Example 18 had higher mass activity and specific area than Illustrative Example 1, discussed above. Without being bound by theory, the presence of Ir within a Ni-containing underlayer may provide improved stability of the layer as compared to a Ni underlayer without Ir, due to preferential bond formation between Ir and Ni than between Pt and Ni.

Figure 5:
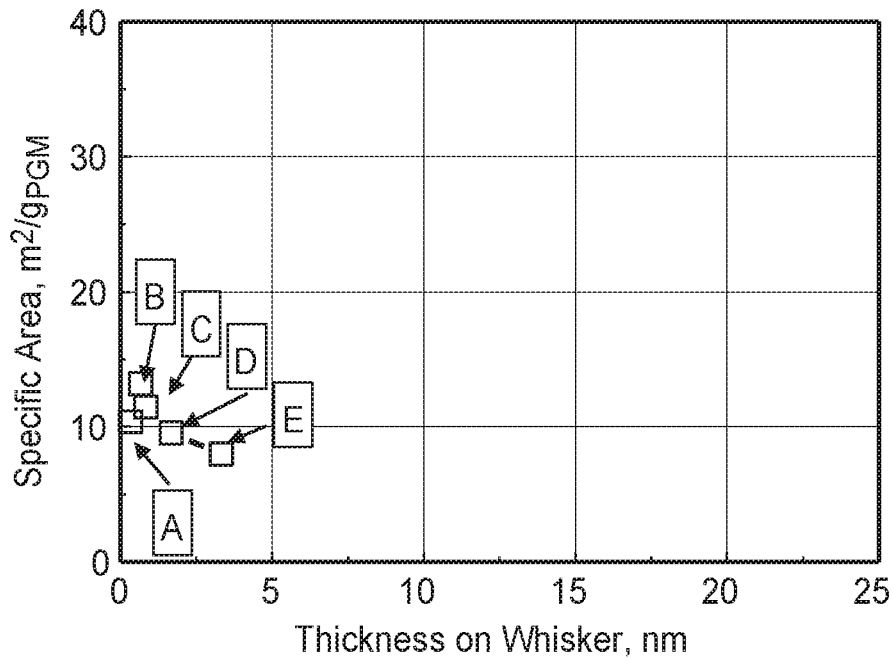
FIG. 5 is a plot of the electrocatalyst specific surface area as a function of catalyst thickness of Comparative Examples A-E catalysts, normalized to platinum group metal content.

FIG. 5 is a plot of the measured specific surface areas of Comparative Examples A-E, from Table 7, above, as a function of the catalyst thickness on microstructured whiskers from Table 4, above. The specific areas of Comparative Examples A-E ranged from 8.0 to 13.2 $m^2$/g as the thicknesses on microstructured whiskers ranged from 0.33 to 3.33 nm. As the catalyst thickness on microstructured whisker increased from 0.67 to 3.33 nm, the specific areas of Comparative Examples B-E decreased monotonically from 13.1 to 8.0 $m^2$/g. Without being bound by theory, the specific area of Comparative Examples B-E decreased as the catalyst thickness increased due to decreased Pt utilization. As the thickness of pure Pt catalyst on the microstructured whisker increased, a smaller mass proportion of the Pt is present at the surface.

Figure 6:
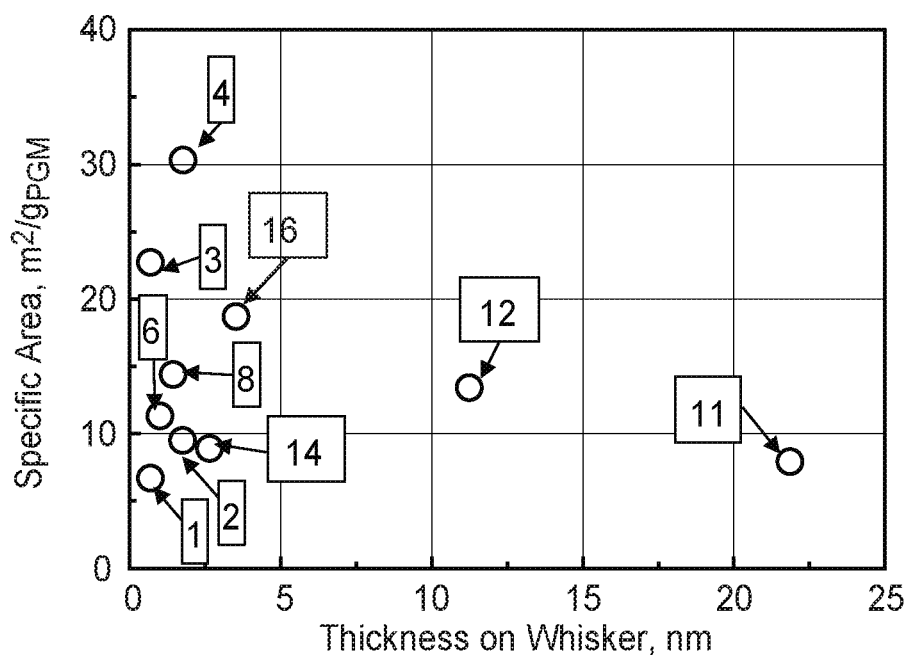
FIG. 6 is a plot of the electrocatalyst specific surface area as a function of catalyst thickness of Examples 1-4, 6, 8, 11, 12, 14, and 16 catalysts, normalized to platinum group metal content.

FIG. 6 is a plot of the measured specific areas of Examples 1-4, 6, 8, 11-12, 14, and 16 from Table 7, above, as a function of catalyst thickness on microstructured whiskers from Table 4, above. The catalyst thickness range on microstructured whisker of Examples 1-4, 6, 8, and 14 was 0.68 to 2.66, within the range of Comparative Examples B-E. The specific areas of Examples 1-4, 6, 8, and 14 ranged from 6.7 to 30.3 $m^2$/g, with Examples 3, 4, and 8 yielding specific areas of 22.7 to 30.3 $m^2$/g, higher than the specific areas of the Comparative Examples in FIG. 5, which ranged from 13.1 to 8.0 $m^2$/g. Examples 12 and 16 had thicknesses on microstructured whiskers of 11.2 and 3.5 nm, higher than the range of the Comparative Examples. The specific areas of Examples 12 and 16 were 13.4 and 18.7 $m^2$/g, respectively, which was higher than the Comparative Examples B-E.

Table 9, below, summarizes the measured specific areas and catalyst thicknesses on microstructured whiskers of Comparative Examples A-E, and Examples 1-10, 14 and 16. Table 9 also summarizes the estimated specific areas of Pt catalysts without an underlayer at the same catalyst thickness as Examples 1-10, 14, and 16, based on the measured Comparative Examples A-E specific areas and thicknesses, discussed further below. Table 9 also lists the calculated increase in specific area of Examples 1-10, 14, and 16 relative to the estimated specific area of Pt catalysts without an underlayer at the same catalyst thickness as the Examples.

TABLE 9

| Example | Measured Specific Area, $m^2$/g | Estimated Thickness on Support, nm | Estimated Specific Area of Pt, $m^2$/g | Specific Area Increase vs. Pt Only, % |
|---|---|---|---|---|
| Comparative Example A | 10.4 | 0.33 | 10.4 | 0 |
| Comparative Example B | 13.2 | 0.67 | 13.2 | 0 |
| Comparative Example C | 11.4 | 0.83 | 11.4 | 0 |
| Comparative Example D | 9.5 | 1.67 | 9.5 | 0 |
| Comparative Example E | 8.0 | 3.33 | 8.0 | 0 |
| Example 1 | 6.7 | 0.70 | 12.8 | −48 |
| Example 2 | 9.5 | 1.76 | 9.4 | 1 |
| Example 3 | 22.7 | 0.70 | 12.8 | 78 |
| Example 4 | 30.3 | 1.78 | 9.4 | 222 |
| Example 5 | 1.5 | 0.68 | 13.0 | −88 |
| Example 6 | 11.3 | 1.01 | 11.0 | 2 |
| Example 7 | 1.6 | 1.01 | 11.0 | −85 |
| Example 8 | 14.4 | 1.46 | 10.0 | 44 |

TABLE 9-continued

| Example | Measured Specific Area, m²/g | Estimated Thickness on Support, nm | Estimated Specific Area of Pt, m²/g | Specific Area Increase vs. Pt Only, % |
|---|---|---|---|---|
| Example 9 | 4.5 | 0.51 | 11.9 | −62 |
| Example 10 | 2.1 | 1.20 | 10.6 | −80 |
| Example 14 | 8.9 | 2.66 | 8.6 | 4 |
| Example 16 | 18.7 | 3.53 | 7.8 | 140 |

Comparative Example data was not available at the precise thicknesses on support as the Examples. Using the Comparative Examples A-E data, linear interpolation was used to estimate the specific surface areas at the specific catalyst thicknesses of Examples 1-10, 14 and 16. For example, the catalyst thickness on microstructured whisker for Example 8, which comprised an underlayer comprising Ti and N, was 1.46 nm and the measured specific area was 14.4 m²/g. The Pt thicknesses for Comparative Examples C and D (which did not contain an underlayer) were 0.83 and 1.67, respectively, and the associated specific areas were 11.4 and 9.5 m²/g, respectively. Using linear interpolation, the estimated specific area of a Pt catalyst without an underlayer at 1.46 nm thickness was estimated as 10.0 m²/g. The specific area of Example 8 was 44% higher than that estimated for Pt only at the same thickness on microstructured whisker ((14.4-10.0)/10.0*100%). Analogous analyses were conducted for the Comparative Examples A-E and Examples 1-7, 9, 10, 14, and 16 data. The specific areas of Examples 1-10, 14 and 16 ranged from 80% lower to 222% higher than Comparative Examples A-E on a thickness basis. The specific area of these Examples relative to these Comparative Examples depends upon Pt thickness, underlayer thickness, Pt to collective underlayer metal atomic ratio, and the underlayer composition, including oxygen and nitrogen content.

Illustrative Example 16, referring to Example 16 from application U.S. Ser. No. 62/657,189, filed Apr. 13, 2018, was constructed similarly to Illustrative Example 2, discussed above, but incorporated an Ir layer between the Pt surface layer and a Ta underlayer. The mass activity and specific area of Illustrative Example 16 was 0.22 A/mg$_{PGM}$ and 19.1 m²/g$_{PGM}$, respectively, higher than the mass activity and specific area of Illustrative Example 2, 0.09 A/mg$_{PGM}$ and 3.2 m²/g$_{PGM}$. As discussed above, Illustrative Example 2 with a Ta underlayer had similar mass activity to Examples 1 and 3, which had Ti and W underlayers. As discussed in application having U.S. Ser. No. 62/657,189, filed Apr. 13, 2018, the presence of Ir between the surface Pt and Ta underlayer may improve the mass activity and specific area relative to catalysts without the Ir layer due to improved adhesion and wetting of the Ir to Ta than Pt to Ta, and improved adhesion and wetting of Pt to Ir than Pt to Ta. Without being bound by theory, enhanced mass activity and specific area may similarly occur with an Ir layer between the Pt surface layer and underlayers comprising at least one of Ti, W, Hf, Zr, or Nb.

Illustrative Example 12, referring to Example 12 from application having U.S. Ser. No. 62/657,189, filed Apr. 13, 2018, was constructed similarly to Illustrative Example 2 but the Pt surface layer also comprised Ni. The mass activity of Illustrative Example 12 was 0.25 A/mg$_{PGM}$, higher than the mass activity of Illustrative Example 2, 0.09 A/mg$_{PGM}$. As discussed above, Illustrative Example 2 with a Ta underlayer had similar mass activity to Examples 1 and 3, which had Ti and W underlayers. Without being bound by theory, enhanced mass activity may similarly occur for catalysts with Pt surface layers comprising Ni and underlayers comprising at least one of Ti, W, Hf, Zr, or Nb.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An article comprising nanostructured elements comprising microstructured whiskers having an outer surface having a catalyst thereon, the catalyst comprising a first layer comprising a first material, wherein the first material comprises at least one of Ti, Hf, or Zr, the first layer having an outer layer with a layer comprising Pt directly thereon, wherein the first layer has an average thickness in a range from 0.04 to 30 nanometers, wherein the layer comprising Pt has an average thickness in a range from 0.04 to 50 nanometers, wherein the Pt and the at least one of Ti, Hf, or Zr collectively are present in an atomic ratio range from 0.01:1 to 10:1, and wherein the first material further comprises at least one of Ni, Co, Fe, Mn, Ir, or Pt.

2. The article of claim 1, wherein the catalyst surface area is at least 5 percent greater than would be present without the presence of the first layer.

3. The article of claim 1, wherein the catalyst further comprises at least one pair of alternating layers, wherein a first alternating layer comprises the first material, and wherein a second alternating layer comprises Pt.

4. A method of making the article of claim 1, the method comprising depositing onto the outer surface of the microstructured whiskers any of the catalyst layers via a deposition technique independently selected from the group consisting of sputtering, atomic layer deposition, metal organic chemical vapor deposition, molecular beam epitaxy, ion soft landing, thermal physical vapor deposition, vacuum deposition by electrospray ionization, and pulse laser deposition.

5. The article of claim 1, wherein the first material further comprises at least one of O, N, or C.

6. The article of claim 5, wherein the catalyst surface area is at least 5 percent greater than would be present without the presence of the first layer.

7. The article of claim 5, wherein the catalyst further comprises at least one pair of alternating layers, wherein a first alternating layer comprises the first material, and wherein a second alternating layer comprises Pt.

8. A method of making the article of claim 5, the method comprising depositing onto the outer surface of the microstructured whiskers any of the catalyst layers via a deposition technique independently selected from the group consisting of sputtering, atomic layer deposition, metal organic chemical vapor deposition, molecular beam epitaxy, ion soft landing, thermal physical vapor deposition, vacuum deposition by electrospray ionization, and pulse laser deposition.

9. An article comprising nanostructured elements comprising microstructured whiskers having an outer surface having a catalyst thereon, the catalyst comprising a first layer comprising a first material, wherein the first material comprises at least one of Ti, Hf, or Zr, the first layer having an outer layer with a layer comprising Pt directly thereon, wherein the first layer has an average thickness in a range from 0.04 to 30 nanometers, wherein the layer comprising Pt has an average thickness in a range from 0.04 to 50 nanometers, wherein the Pt and the at least one of Ti, Hf, or Zr collectively are present in an atomic ratio range from 0.01:1 to 10:1, and wherein the catalyst further comprises at least one pair of alternating layers, wherein a first alternating layer comprises the first material, and wherein a second alternating layer comprises Pt.

10. An article comprising nanostructured elements comprising microstructured whiskers having an outer surface having a catalyst thereon, the catalyst comprising a first layer comprising a first material, wherein the first material comprises at least one of Ti, Hf, or Zr, the first layer having an outer layer with a layer comprising Pt directly thereon, wherein the first layer has an average thickness in a range from 0.04 to 30 nanometers, wherein the layer comprising Pt has an average thickness in a range from 0.04 to 50 nanometers, wherein the Pt and the at least one of Ti, Hf, or Zr collectively are present in an atomic ratio range from 0.01:1 to 10:1, wherein the first material further comprises at least one of O, N, or C, and wherein the catalyst further comprises at least one pair of alternating layers, wherein a first alternating layer comprises the first material, and wherein a second alternating layer comprises Pt.

* * * * *